(12) United States Patent
Huang et al.

(10) Patent No.: US 11,729,807 B2
(45) Date of Patent: Aug. 15, 2023

(54) TECHNIQUES FOR TRIGGERING CSI REPORT BASED ON DOWNLINK GRANT SIGNALING

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US); Juan Montojo, San Diego, CA (US); Tingfang Ji, San Diego, CA (US); Hwan Joon Kwon, San Diego, CA (US); Seyedkianoush Hosseini, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 17/395,226

(22) Filed: Aug. 5, 2021

(65) Prior Publication Data
US 2022/0046656 A1 Feb. 10, 2022

Related U.S. Application Data

(60) Provisional application No. 63/063,044, filed on Aug. 7, 2020.

(51) Int. Cl.
*H04W 72/54* (2023.01)
*H04L 1/1867* (2023.01)
(Continued)

(52) U.S. Cl.
CPC .......... *H04W 72/54* (2023.01); *H04L 1/1819* (2013.01); *H04L 1/1896* (2013.01); *H04W 72/1268* (2013.01); *H04W 72/23* (2023.01)

(58) Field of Classification Search
None
See application file for complete search history.

(56) References Cited

U.S. PATENT DOCUMENTS

| 2016/0112892 | A1* | 4/2016 | Damnjanovic ... H04W 72/0446 370/336 |
| 2020/0128533 | A1 | 4/2020 | Li et al. |
| 2021/0337536 | A1* | 10/2021 | Li ......................... H04L 5/0057 |

FOREIGN PATENT DOCUMENTS

| WO | 2020065626 A1 | 4/2020 |
| WO | 2020140967 A1 | 7/2020 |
| WO | 2020143441 A1 | 7/2020 |

OTHER PUBLICATIONS

International Search Report and Written Opinion—PCT/US2021/045057—ISA/EPO—dated Nov. 12, 2021.

* cited by examiner

*Primary Examiner* — Hong S Cho
(74) *Attorney, Agent, or Firm* — Arent Fox LLP/Qualcomm Incorporated

(57) ABSTRACT

Aspects of the present disclosure provide techniques for triggering generation and transmission of a channel state information (CSI) report by the user equipment (UE) in response to issuance of at least one downlink grant by the base station. Additionally, in order to address unique challenges that may arise with respect to traffic collisions and desynchronizations based on downlink grant CSI report triggering (e.g., missing downlink control information (DCI)), aspects of the present disclosure may further implement restrictions for transmission of aperiodic CSI (A-CSI) by the UE on physical uplink control channel (PUCCH) triggered by downlink grant. Additionally, aspects of the present disclosure provide techniques for utilizing a duplicate CSI trigger indication (e.g., indicator in downlink DCI)

(Continued)

between multiple messages in order to signal to the UE that the transmission of A-CSI may be multiplexed or merged with another uplink message (e.g., acknowledgement).

27 Claims, 11 Drawing Sheets

(51) Int. Cl.
*H04L 1/1812* (2023.01)
*H04W 72/1268* (2023.01)
*H04W 72/23* (2023.01)

US 11,729,807 B2

TECHNIQUES FOR TRIGGERING CSI REPORT BASED ON DOWNLINK GRANT SIGNALING

CROSS-REFERENCE TO RELATED APPLICATION(S)

The present application claims benefit of U.S. Provisional Application No. 63/063,044 entitled "TECHNIQUES FOR TRIGGERING CSI REPORT BASED ON DOWNLINK GRANT SIGNALING" filed Aug. 7, 2020, which is assigned to the assignee hereof and hereby expressly incorporated by reference herein.

TECHNICAL FIELD

The present disclosure relates to wireless communication systems, and more particularly, to techniques for triggering generation of channel state information (CSI) report based on a downlink grant signaling transmitted by a base station.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

SUMMARY

Aspects of the present disclosure provide techniques for triggering generation and transmission of a channel state information (CSI) report by the user equipment (UE) in response to issuance of at least one downlink grant by the base station. Additionally, in order to address unique challenges that may arise with respect to traffic collisions and desynchronizations based on downlink grant CSI report triggering (e.g., missing downlink control information (DCI)), aspects of the present disclosure may further implement restrictions for transmission of aperiodic CSI (A-CSI) by the UE on physical uplink control channel (PUCCH) triggered by downlink grant. For example, the UE may be configured to restrict transmission of at most one A-CSI on PUCCH during a single slot/sub-slot (e.g., transmission opportunity). Additionally, aspects of the present disclosure provide techniques for utilizing a duplicate CSI trigger indication (e.g., indicator in downlink DCI) between multiple messages in order to signal to the UE that the transmission of A-CSI may be multiplexed or merged with another uplink message (e.g., acknowledgement).

In one example, a method for wireless communication implemented by a UE is disclosed. The method may include receiving, at a UE, a first scheduling grant message from a base station during a first time period, wherein the first scheduling grant message is a downlink grant that includes a first channel state information (CSI) trigger indication for the UE. The method may further include receiving, at the UE, a second scheduling grant message from the base station during a second time period, wherein the second scheduling grant message includes a second CSI trigger indication for the UE that is same as the first CSI trigger indication included in the first scheduling grant message. The method may further include generating a CSI report based on receiving one or both of the first scheduling grant message or the second scheduling grant message. The method may further include transmitting the CSI report from the UE to the base station on a physical uplink control channel (PUCCH), wherein the UE is restricted from transmitting more than one CSI report in a single transmission opportunity.

In another example, an apparatus for wireless communications. The apparatus may include a memory having instructions and a processor configured to execute the instructions to receive, at a UE, a first scheduling grant message from a base station during a first time period, wherein the first scheduling grant message is a downlink grant that includes a first CSI trigger indication for the UE. The processor may further be configured to execute the instructions to receive, at the UE, a second scheduling grant message from the base station during a second time period, wherein the second scheduling grant message includes a second CSI trigger indication for the UE that is same as the first CSI trigger indication included in the first scheduling grant message. The processor may further be configured to execute the instructions to generate a CSI report based on receiving one or both of the first scheduling grant message or the second scheduling grant message. The process may further be configured to execute the instructions to transmit the CSI report from the UE to the base station on a PUCCH, wherein the UE is restricted from transmitting more than one CSI report in a single transmission opportunity.

In some aspects, a non-transitory computer readable medium includes instructions stored therein that, when executed by a processor, cause the processor to perform the steps of receiving, at a UE, a first scheduling grant message from a base station during a first time period, wherein the first scheduling grant message is a downlink grant that includes a first CSI trigger indication for the UE. In some examples, the processor may further perform the steps of receiving, at the UE, a second scheduling grant message from the base station during a second time period, wherein the second scheduling grant message includes a second CSI trigger indication for the UE that is same as the first CSI trigger indication included in the first scheduling grant message. In some examples, the processor may further perform the steps of generating a CSI report based on receiving one or both of the first scheduling grant message or the second scheduling grant message. In some examples, the processor may further perform the steps of transmitting the CSI report from the UE to the base station on a PUCCH, wherein the UE is restricted from transmitting more than one CSI report in a single transmission opportunity.

In certain aspects, another apparatus for wireless communication is disclosed. The apparatus may include means for receiving, at a UE, a first scheduling grant message from a base station during a first time period, wherein the first scheduling grant message is a downlink grant that includes a first CSI trigger indication for the UE. The apparatus may further include means for receiving, at the UE, a second scheduling grant message from the base station during a second time period, wherein the second scheduling grant message includes a second CSI trigger indication for the UE that is same as the first CSI trigger indication included in the first scheduling grant message. The apparatus may further include means for generating a CSI report based on receiving one or both of the first scheduling grant message or the second scheduling grant message. The apparatus may further include means for transmitting the CSI report from the UE to the base station on a PUCCH, wherein the UE is restricted from transmitting more than one CSI report in a single transmission opportunity.

In another example, another method implemented by a base station is disclosed. The method may include transmitting a first scheduling grant message from a base station to a UE during a first time period, wherein the first scheduling grant message is a downlink grant that includes a first CSI trigger indication for the UE. The method may further include generating a second scheduling grant message that includes a second CSI trigger indication that is identical to the first CSI trigger indication transmitted in the first scheduling grant message, wherein the second scheduling grant message is one of a second downlink grant message or an uplink grant message. The method may further include transmitting the second scheduling grant message to the UE during a second time period. The method may further include receiving a CSI report from the UE in response to transmission of the first scheduling grant message and the second scheduling grant message, wherein the base station receives no more than a single CSI report during a single transmission opportunity from the UE.

In another example, an apparatus for wireless communications. The apparatus may include a memory having instructions and a processor configured to execute the instructions to transmit a first scheduling grant message from a base station to a UE during a first time period, wherein the first scheduling grant message is a downlink grant that includes a first CSI trigger indication for the UE. The processor may further be configured to execute the instructions to generate a second scheduling grant message that includes a second CSI trigger indication that is identical to the first CSI trigger indication transmitted in the first scheduling grant message, wherein the second scheduling grant message is one of a second downlink grant message or an uplink grant message. The processor may further be configured to execute the instructions to transmit the second scheduling grant message to the UE during a second time period. The processor may further be configured to execute the instructions to receive a CSI report from the UE in response to transmission of the first scheduling grant message and the second scheduling grant message, wherein the base station receives no more than a single CSI report during a single transmission opportunity from the UE.

In some aspects, a non-transitory computer readable medium includes instructions stored therein that, when executed by a processor, cause the processor to perform the steps of transmitting a first scheduling grant message from a base station to a UE during a first time period, wherein the first scheduling grant message is a downlink grant that includes a first CSI trigger indication for the UE. In some examples, the processor may further perform the steps of generating a second scheduling grant message that includes a second CSI trigger indication that is identical to the first CSI trigger indication transmitted in the first scheduling grant message, wherein the second scheduling grant message is one of a second downlink grant message or an uplink grant message. In some examples, the processor may further perform the steps of transmitting the second scheduling grant message to the UE during a second time period. In some examples, the processor may further perform the steps of receiving a CSI report from the UE in response to transmission of the first scheduling grant message and the second scheduling grant message, wherein the base station receives no more than a single CSI report during a single transmission opportunity from the UE.

In certain aspects, another apparatus for wireless communication is disclosed. The apparatus may include means for transmitting a first scheduling grant message from a base station to a UE during a first time period, wherein the first scheduling grant message is a downlink grant that includes a first CSI trigger indication for the UE. The apparatus may further include means for generating a second scheduling grant message that includes a second CSI trigger indication that is identical to the first CSI trigger indication transmitted in the first scheduling grant message, wherein the second scheduling grant message is one of a second downlink grant message or an uplink grant message. The apparatus may further include means for transmitting the second scheduling grant message to the UE during a second time period. The method may further include receiving a CSI report from the UE in response to transmission of the first scheduling grant message and the second scheduling grant message, wherein the base station receives no more than a single CSI report during a single transmission opportunity from the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
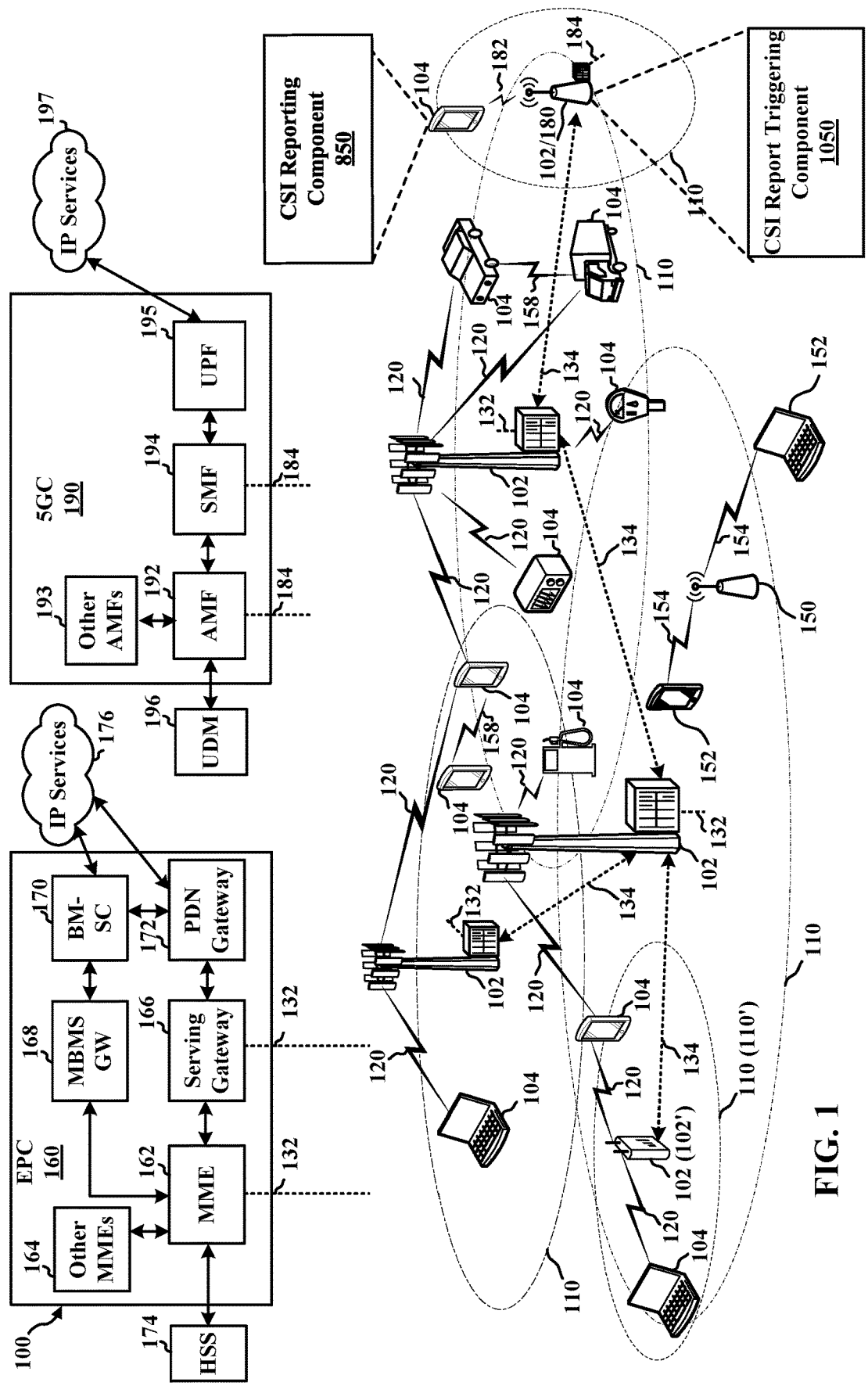
FIG. 1 is a schematic diagram of an example of a wireless communications system in accordance with aspects of the present disclosure.

In wireless communication systems, base stations may schedule the UE to transmit an aperiodic channel state information (A-CSI) report on physical uplink shared channel (PUSCH) using an uplink grant. In recent years, however, with the introduction of a myriad of smart handheld devices, user demand for mobile broadband has dramatically increased. To this end, in emerging wireless systems such as with the 5G communications technology, the demand for downlink traffic (e.g., from base station to UE) is anticipated to far exceed the amount of uplink traffic (e.g., from the UE to base station). This is generally because of bandwidth-hungry applications such as video streaming and multimedia file sharing that are pushing the limits of current cellular systems.

In wireless communications, channel state information (CSI) refers to channel properties of a communication link. This information describes how a signal propagates from the transmitter to the receiver and represents the combined effect of, for example, scattering, fading, and power decay with distance. The method may be referred to as channel estimation. The CSI makes it possible to adapt the transmissions to current channel conditions, which may be crucial for achieving reliable communication with high data rates in wireless systems.

However, reliance on uplink grant triggers for A-CSI reporting may not be ideal in scenarios where the wireless traffic is disproportionally favored towards downlink transmissions. Indeed, limiting the CSI report trigger to uplink grant may require additional bandwidth resources and adversely impact latency between the base station and the UE. Thus, aspects of the present disclosure provide techniques for triggering generation and transmission of an A-CSI report by the UE in response to issuance of a downlink grant by the base station. Utilization of the downlink grant (as opposed to uplink grant) may enable faster A-CSI reporting and may provide the base station with more up-to-date CSI information, which in turn may help improve downlink scheduling of data between the base station and the UE. Additionally, the downlink triggered CSI-RS report may also be supported for reduced latency and increased reliability.

Specifically, in some aspects, downlink control information (DCI) may include a CSI trigger field (e.g., x bits where x is an integer value greater than or equal to 1) to indicate the CSI trigger state for the UE. In some aspects, the CSI trigger state may identify the CSI report setting (e.g., type of CSI report that the UE may generate in response to receiving the downlink grant with CSI trigger indication) and/or CSI-reference signal (CSI-RS) resource setting (e.g., the resources for transmission of CSI-RS.

In other instances, the downlink grant CSI report trigger may be based on self-decodable CSI and hybrid automatic repeat request (HARD)/acknowledgement (ACK) of the downlink grant where the CSI and the HARQ-ACK are transmitted in separate PUCCH resources from the UE to the base station. Such implementation may allow for faster CSI feedback for ultra-reliable low-latency communication (URLLC).

In some scenarios, the UE may receive multiple downlink grants (or combination of downlink and/or uplink grant) from the base station, each separately triggering a generation and transmission of an A-CSI report from the UE to the base station on PUCCH and/or transmission of HARQ-ACK. However, if the transmission of A-CSI on PUCCH overlaps with another PUCCH transmissions (including a second A-CSI or HARQ-ACK message) in a particular slot or sub-slots (collectively "transmission opportunity"), or if the transmission of A-CSI overlaps with another PUSCH transmission, then there may be instances of traffic collision. In addition, in order to ensure proper decoding of the A-CSI and overlapping PUCCH transmission by the base station, the payload size of the transmission after multiplexing (e.g., mux HARQ-ACK with A-CSI on PUCCH) must be collectively known to both the base station and the UE.

However, in some cases, the DCIs that schedule the HARQ-ACK or A-CSI may be missing. For example, in some instances, a transmission by the base station of a downlink grant or physical downlink shared channel (PDSCH) that requires HARQ-ACK may not be received by the UE due to poor channel conditions between the base station and the UE. In such an instance, the base station may falsely anticipate receiving a multiplexed payload during a transmission opportunity from the UE that includes both an A-CSI and HARQ-ACK multiplexed message or multiple A-CSIs (e.g., first CSI report and second CSI report). However, given that the UE may not have received at least one message (e.g., DCI) due to poor channel conditions, the UE may transmit either only the A-CSI or the HARQ-ACK in response to the transmissions by the base station. Such uplink payload may not be properly decoded by the base station because the base station may decode the payload as a multiplexed message, whereas the UE may have only transmitted one of the A-CSI or the HARQ-ACK. The desynchronization between the UE and the base station in such instances may adversely impact the ability for the base station to receive and decode messages from the UE, including CSI reports.

In order to address such collisions and desynchronizations that may arise due to missing DCI, aspects of the present disclosure may implement restrictions for A-CSI on PUCCH triggered by downlink grant. For example, the UE may be configured to restrict transmission of at most one A-CSI on PUCCH that overlaps in terms of frequency and time resources during the same slot/sub-slot (e.g., transmission opportunity). Thus, the phrase "overlapping" may refer to transmission of multiple uplink payloads by the UE during the same timeslot/sub-slot. In such instances, the UE may typically multiplex or merge the plurality of uplink payloads together to form a single payload. In other instances, the UE may be restricted to receive at most one downlink grant on any one slot/sub-slot which triggers A-CSI on PUCCH in order to minimize possible collisions of multiple uplink transmissions on a single transmission opportunity.

Specifically, since the A-CSI on PUCCH may overlap with ACK/NACK of PDSCH that may be scheduled by another downlink DCIs (e.g., second DCI), aspects of the present disclosure may address this missing grant issue (e.g., if UE fails to receive the downlink grant triggering A-CSI report on PUCCH) by implementing a technique wherein the CSI trigger field (e.g., x bits) in downlink grant A (e.g., first scheduling grant message) may include a first CSI trigger indication for the UE that includes CSI trigger state (e.g., CSI report setting and/or CSI-RS resource setting). The CSI trigger indication for the first downlink grant may be duplicated for a subsequent downlink or uplink grant that triggers the A-CSI. The duplicate CSI trigger indication in multiple scheduling grant message may allow the base station to notify the UE that the ACK/NACK of the second scheduling grant message (e.g., downlink or uplink grant) that is scheduled for PDSCH may need to be multiplexed or merged with a CSI report.

Therefore, even in scenarios where the UE fails to receive the first scheduling grant message (e.g., DL grant A), for example, the UE may prepare a CSI report for the base station and appropriately multiplex the uplink payload (e.g., ACK/NACK with CSI report) based on the duplicated CSI trigger indication that may be included in a second scheduling grant message from the base station. In addition, in light of the implementation of restrictions for A-CSI on PUCCH (e.g., the UE may be configured to restrict transmission of at most one A-CSI on PUCCH that overlaps in time and frequency domain during the same slot/sub-slot), the UE may determine the accurate number of CSI reports that need to be prepared for feedback to the base station for both the first scheduling grant message and second scheduling grant message even in instances where the UE fails to receive one of the grant messages.

In cases of carrier aggregation, the CSI trigger field that includes the CSI trigger indication may be duplicated for all subsequent downlink grant messages (e.g., second scheduling grant message and third scheduling grant message) across a plurality of component carriers scheduling the PDSCHS with associated ACK/NACKs that may overlap with the CSI report (e.g., triggered by the first scheduling grant message). Alternatively, in other examples, the CSI trigger field that includes the CSI trigger indication may be duplicated for part of subsequent downlink grant messages (e.g., second scheduling grant message or third scheduling grant message) across a plurality of component carriers scheduling the PDSCHS with associated ACK/NACKs that may overlap with the CSI report.

In other instances, the radio resource control (RRC) may configure only a single trigger state for simplification of operation. For example, in one instance, one trigger (in one single downlink grant) may only trigger an A-CSI on PUCCH carrier for a single report that contains CSI on only the downlink component carrier that may receive the downlink grant. Such implementation has advantage of lower overhead in resources, but may not be configured to report CSIs for all component carriers. Alternatively, in another example, one trigger (in one single downlink grant) can only trigger an A-CSI on PUCCH carrier for a single report contains CSI for all DL CCs. Such implementation may provide full report of CSI of all downlink component carriers, but have a larger overlap due to over-report. Additional simplification techniques may include configuring the CSI trigger field to a single bit (e.g., x=1 bit) for all downlink grants that follow the first scheduling grant message (e.g., downlink grant A) triggering A-CSI report on PUCCH if the associated ACK/NACK for the PDSCHs scheduled by later DL grants overlap with the A-CSI report triggered by the first scheduling grant message.

In some examples, the second scheduling grant message may be an uplink grant message (e.g., where the first scheduling grant message is downlink grant during a first time period followed by the uplink grant during a second time period). In such instances, when A-CSI report is triggered by first scheduling grant message (e.g., DL grant A) and overlaps with PUSCH scheduled by the second scheduling grant (e.g., UL grant D) where the UL grant (D) is received later than DL grant (A), the base station may be configured to either duplicate the A-CSI trigger from the DL grant (A) into UL grant (D), or override the A-CSI trigger from the DL grant (A) by a new trigger in UL grant (D). In turn, the UE may be configured to ignore or discard the trigger in the first scheduling grant message (e.g., DL grant A) and follow the trigger in second scheduling grant (e.g., UL grant D (later grant)).

Finally, in some examples, the downlink grant message may be the second scheduling grant message that is preceded by the uplink grant (e.g., first scheduling grant message). In such scenario where the UL grant (D) is received earlier than the DL grant (A), the UE may either: (1) treat this case as an error case; (2) follow the A-CSI trigger in UL grant (earlier grant), ignore the A-CSI trigger in DL grant (later grant); (3) if UL grant already has A-CSI trigger, follow the A-CSI trigger in UL grant and ignore the A-CSI trigger in the DL grant; otherwise, follow the A-CSI trigger in the DL grant to generate CSI report, multiplex the CSI report on PUSCH by puncture certain plurality of PUSCH REs or (4) follow the A-CSI trigger in the later grant, which DL grant A.

Various aspects are now described in more detail with reference to the FIGS. 1-11. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some UEs 104 of the wireless communication system may have a modem 814 and a CSI reporting component 850 (see FIG. 8) for responding to CSI report trigger in response to the downlink grants issued by the base station and for performing the aspects of present disclosure. Additionally or alternatively, one or more base stations 102/180 may include CSI report triggering component 1150 for issuing one or more scheduling grant messages (e.g., downlink and/or uplink grants) to trigger CSI reporting from the UE.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineering (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
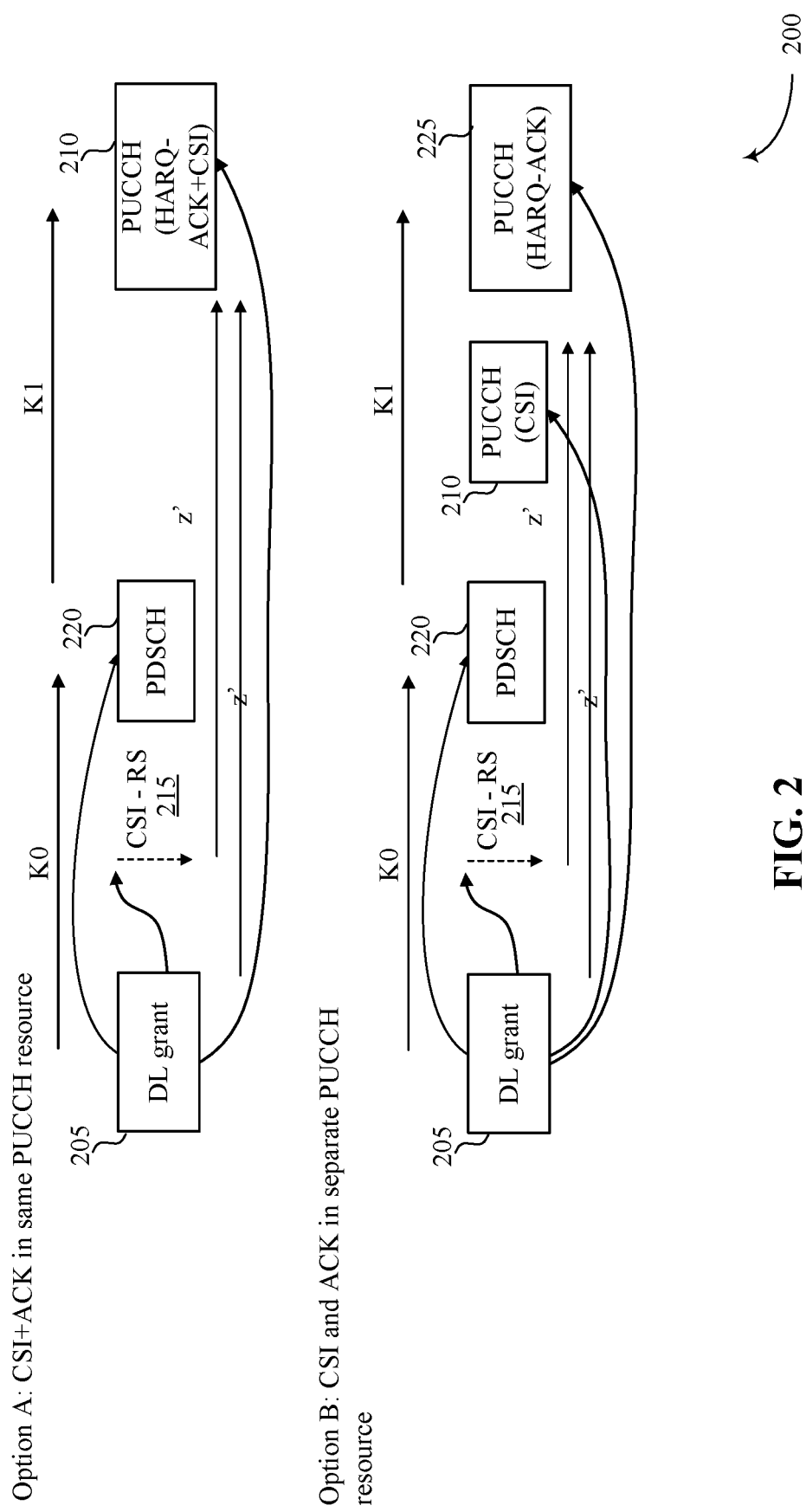
FIG. 2 is a timing diagram of an example of downlink grant trigger of CSI reports on PUCCH in accordance with aspects of the present disclosure.

FIG. 2 is a timing diagram 200 of an example of downlink grant trigger 205 of CSI reports 210 on PUCCH in accordance with aspects of the present disclosure. Specifically, in some aspects, DCI transmitted from the base station to the UE may include a CSI trigger field (e.g., x bits where x is an integer value greater than or equal to 1) to indicate the CSI trigger state for the UE. In some aspects, the CSI trigger state may identify the CSI report setting (e.g., type of CSI report that the UE may generate in response to receiving the downlink grant with CSI trigger indication) and/or CSI-RS resource setting (e.g., the resources for transmission of CSI-RS).

In other instances, the downlink grant CSI report trigger may be based on self-decodable CSI and HARQ/ACK of the downlink grant where the CSI and the HARQ-ACK are transmitted in separate PUCCH resources from the UE to the base station. Such implementation may allow for faster CSI feedback for URLLC.

Thus, as illustrated in the timing diagram 200, the base station 102 may transmit a downlink grant message 205 to the UE 104. The downlink grant message 205 may include CSI reporting information, including information related to a CSI-RS. Following the transmission of the downlink grant message 205, the base station 102 may transmit a downlink packet (e.g., PDSCH 220) to the UE. In one example (e.g., Option A), the UE may return the CSI report 210 to the base station as part of the HARQ-ACK associated with the PDSCH 220 that was received at the UE 104. In other words, the UE may combine the CSI report in the same message that transmits the HARQ-ACK. In other examples (e.g., Option B), the transmission of the CSI report 210 to the base station 104 may be separated from the HARQ-ACK 225 in separate transmissions.

Figure 3:
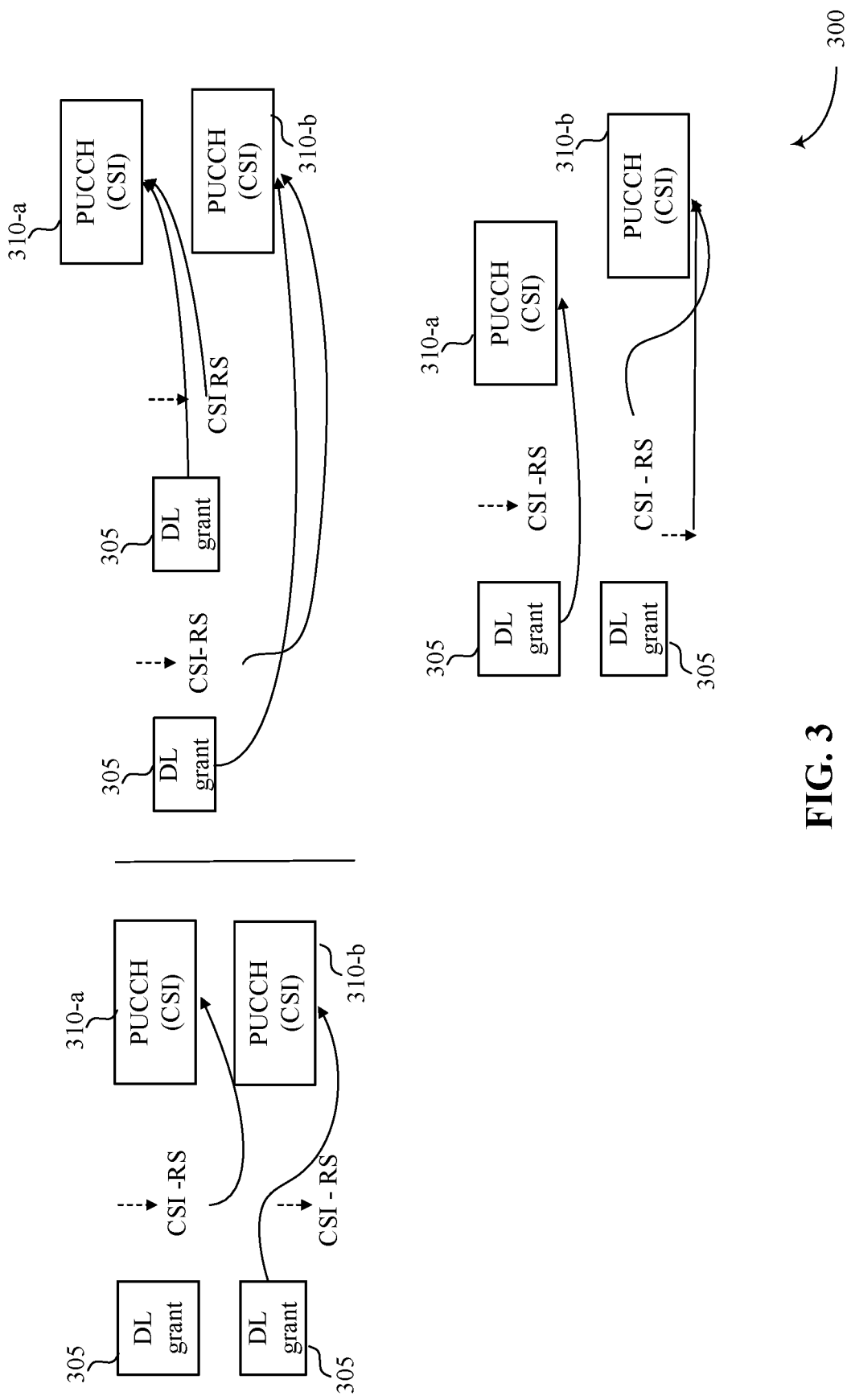
FIG. 3 is a timing diagram of an example of downlink grant trigger of CSI reports on PUCCH restrictions in accordance with aspects of the present disclosure.

FIG. 3 is a timing diagram 300 of an example of downlink grant trigger of CSI reports on PUCCH restrictions in accordance with aspects of the present disclosure. As illustrated, in some scenarios, the UE may receive multiple downlink grants 305 (or combination of downlink and/or uplink grant) from the base station, each separately triggering a generation and transmission of an A-CSI report 310 from the UE to the base station on PUCCH (and/or transmission of HARQ-ACK). However, if the transmission of A-CSI on PUCCH (e.g., first A-CSI 310-*a* on PUCCH) overlaps with another PUCCH transmissions (e.g., a second A-CSI 310-*b* on PUCCH or HARQ-ACK message) in any slot or sub-slots (collectively "transmission opportunity"), then there may be instances of traffic collision between transmission of a first A-CSI 310-*a* and second A-CSI 310-*b* on PUCCH. Such traffic collisions may render the transmission of one or both of A-CSI reports 310 inoperable for the base station. In some instances, the overlapping transmission attempt of A-CSI reports (e.g., a first A-CSI report 310-*a* in first PUCCH and a second A-CSI report 310-b in second PUCCH) during the same slot or sub-slots may also impact the ability of the base station to accurately decode the transmitted A-CSI reports. For example, in order to ensure proper decoding of the A-CSI and overlapping PUCCH transmission by the base station, the payload size of the transmission after multiplexing (e.g., mux HARQ-ACK with A-CSI on PUCCH) must be collectively known to both the base station and the UE. But due to the overlapping (either partial or full overlap) transmissions of multiple PUCCH that include the CSI report, the payload size of the overlapping PUCCHs (e.g., multiplexed first PUCCH 310-a and second PUCCH 310-b) received at the base station may not align with the expected payload size. As such, the base station may be unable to properly decode the two PUCCH 310 that each include respective CSI reports.

In some cases, the DCIs that schedule the HARQ-ACK or A-CSI may also be missing. For example, in some instances, a transmission by the base station of downlink grant or physical downlink shared channel (PDSCH) that requires HARQ-ACK may not be received by the UE due to poor channel conditions between the base station and the UE. In such instance, the base station may falsely anticipate receiving a multiplexed payload during a transmission opportunity from the UE that includes both A-CSI and HARQ-ACK multiplexed message or multiple A-CSIs (e.g., first CSI report and second CSI report). However, given that the UE may not have received at least one message (e.g., DCI) due to poor channel conditions, the UE may transmit either only the A-CSI or the HARQ-ACK in response to the transmissions by the base station. Such uplink payload may also not be properly decoded by the base station because the base station may decode the payload as a multiplexed message, whereas the UE may have only transmitted one of the A-CSI or the HARQ-ACK. The desynchronization between the UE and the base station in such instances may adversely impact the ability for the base station to receive and decode messages from the UE, including CSI reports.

In order to address such collisions and desynchronizations that may arise due to missing DCI, aspects of the present disclosure may implement restrictions for A-CSI on PUCCH triggered by downlink grant. For example, the UE may be configured to restrict transmission of at most one A-CSI on PUCCH that overlaps in time and frequency resources during the same slot/sub-slot (e.g., transmission opportunity). In other instances, the UE may be restricted to receive at most one downlink grant on any one slot/sub-slot which triggers A-CSI on PUCCH in order to minimize possible collisions of multiple uplink transmissions on a single transmission opportunity.

Figure 4:
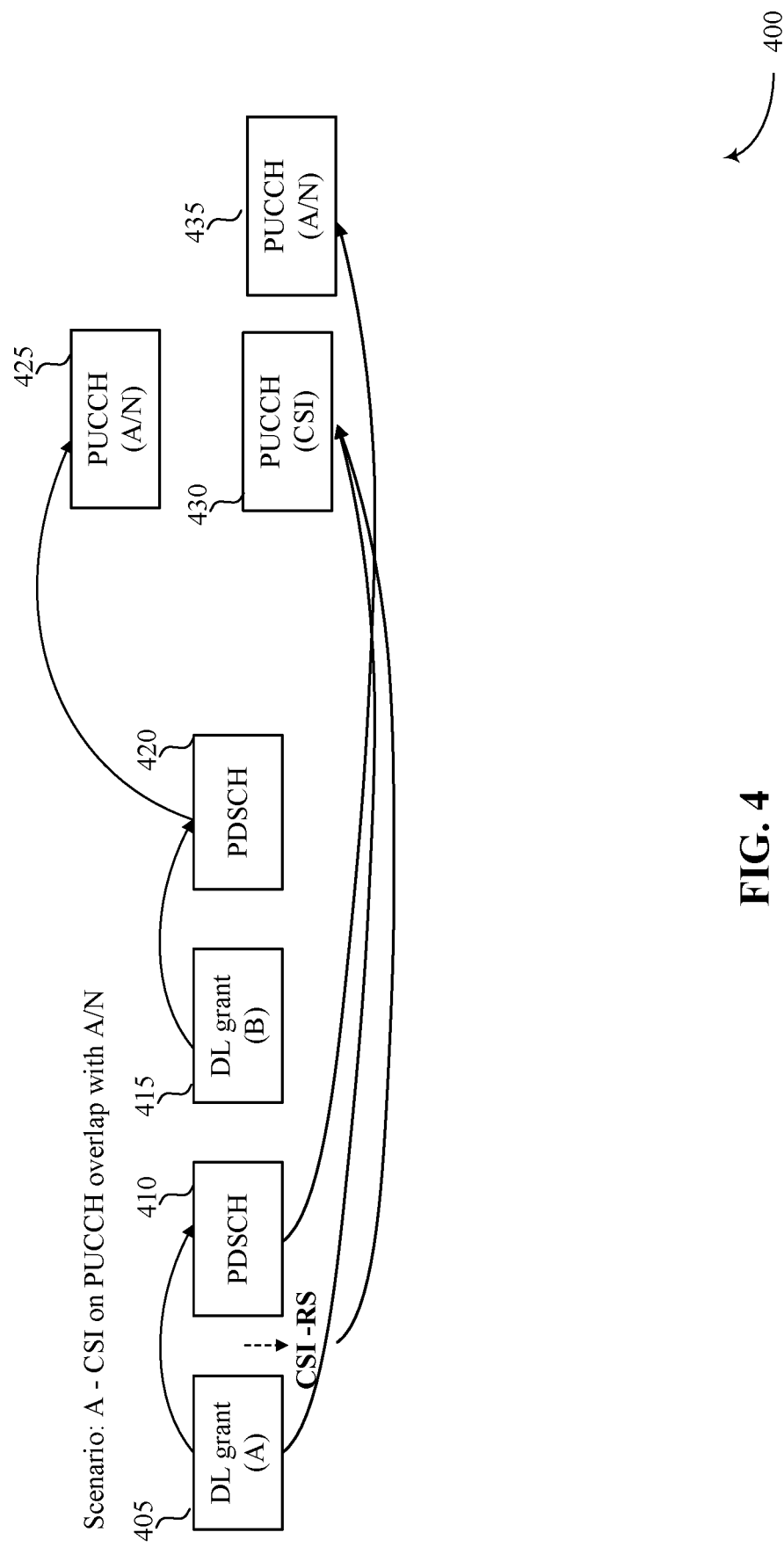
FIG. 4 is a timing diagram of an example of downlink grant trigger of CSI reports on PUCCH addressing missing DCI scenario in accordance with aspects of the present disclosure.

FIG. 4 is a timing diagram 400 of an example of downlink grant trigger of CSI reports on PUCCH addressing missing DCI scenario in accordance with aspects of the present disclosure. Specifically, as noted above, since the A-CSI on PUCCH may overlap with ACK/NACK of PDSCH that may be scheduled by another downlink DCIs (e.g., second DCI), aspects of the present disclosure may address this missing grant issue (e.g., if UE fails to receive the downlink grant triggering A-CSI report on PUCCH) by implementing a technique wherein the CSI trigger field (e.g., x bits) in downlink grant A 405 (e.g., first scheduling grant message) may include a first CSI trigger indication for the UE that includes CSI trigger state (e.g., CSI report setting and/or CSI-RS resource setting). The CSI trigger indication for the first downlink grant 405 may be duplicated for a subsequent downlink or uplink grant (e.g., downlink grant B 415) that triggers the A-CSI. The duplicate CSI trigger indication in multiple scheduling grant message may allow the base station to notify the UE that the ACK/NACK 425 of the second scheduling grant message 415 (e.g., downlink or uplink grant) that is scheduled for PDSCH may need to be multiplexed or merged with a CSI report 430.

Therefore, even in scenarios where the UE fails to receive the first scheduling grant message (e.g., DL grant A 405), the UE may prepare a CSI report 430 for the base station and appropriately multiplex the uplink payload (e.g., ACK/NACK 425/435 with CSI report 430) based on the duplicated CSI trigger indication that may be included in a second scheduling grant message 415 from the base station. In addition, in light of the implementation of restrictions for A-CSI on PUCCH (e.g., the UE may be configured to restrict transmission of at most one A-CSI on PUCCH that overlaps during slot/sub-slot), the UE may determine the accurate number of CSI reports 430 that need to be prepared for feedback to the base station for both the first scheduling grant message and second scheduling grant message even in instances where the UE fails to receive one of the grant messages.

Figure 5:
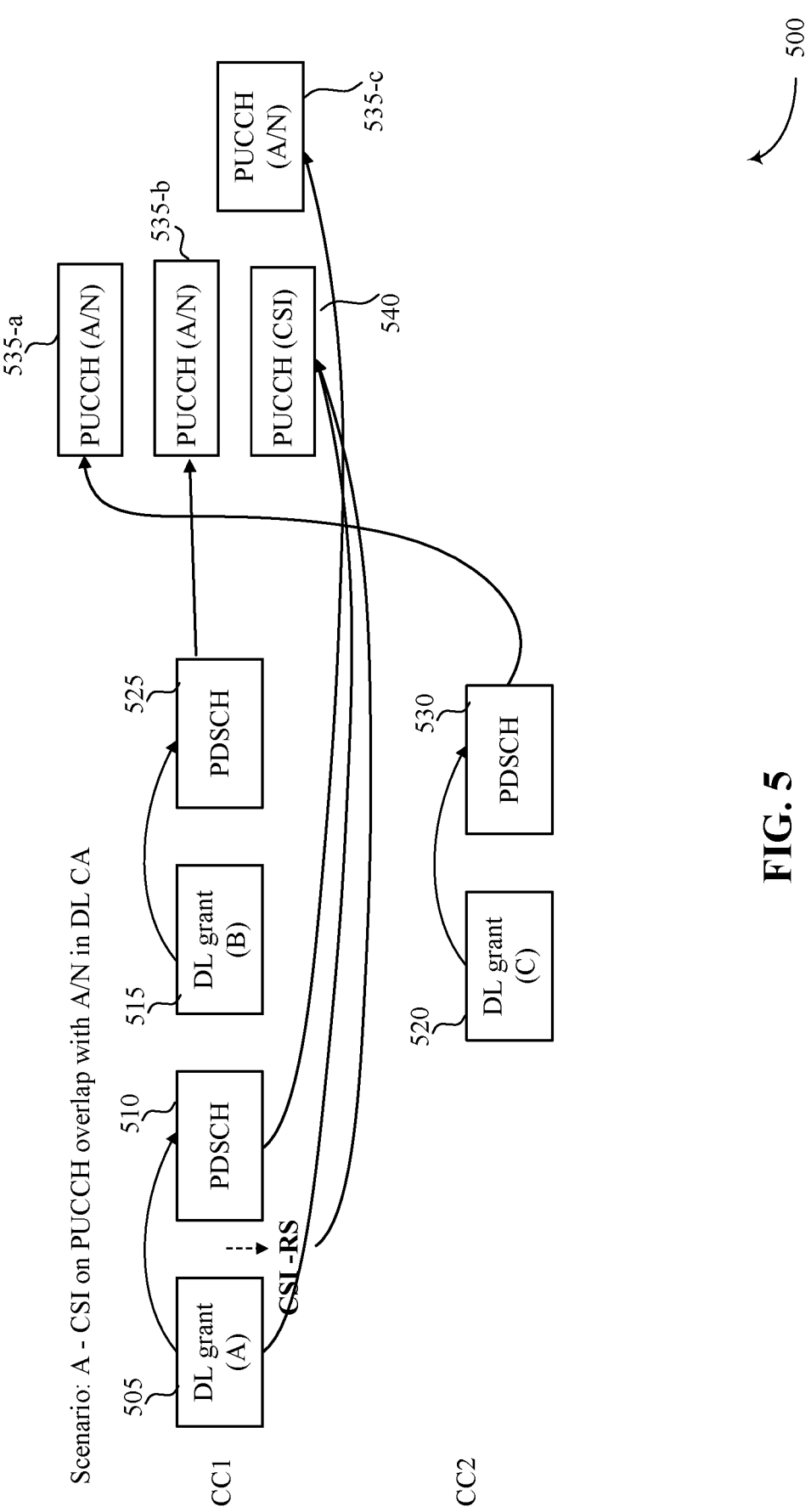
FIG. 5 is a timing diagram of an example of downlink grant trigger of CSI reports on PUCCH for carrier aggregation extension in accordance with aspects of the present disclosure.

FIG. 5 is a timing diagram of an example of downlink grant trigger of CSI reports on PUCCH for carrier aggregation extension in accordance with aspects of the present disclosure. Specifically, in cases of carrier aggregation, the CSI trigger field that includes the CSI trigger indication in a first scheduling grant message (e.g., first DL grant 505) may be duplicated for a plurality of subsequent downlink grant messages (e.g., second scheduling grant message 515 and third scheduling grant message 520) across a plurality of component carriers scheduling the PDSCHS (e.g., first PDSCH 510, second PDSCH 525, and third PDSCH 530) with associated ACK/NACKs 535 (e.g., first ACK/NACK 535-a, second ACK/NACK 535-b, and third ACK/NACK 535-c) that may, in part, overlap with the CSI report 540 (e.g., triggered by the first scheduling grant message). Alternatively, in other examples, the CSI trigger field that includes the CSI trigger indication may be duplicated for part of subsequent downlink grant messages (e.g., second scheduling grant message 515 or third scheduling grant message 520) across a plurality of component carriers scheduling the PDSCHS with associated ACK/NACKs that may overlap with the CSI report.

In some instances, the radio resource control (RRC) may configure only a single trigger state for simplification of operation. For example, in one instance, one trigger (in one single downlink grant) may only trigger an A-CSI on PUCCH carrier for a single report that contains CSI on only the downlink component carrier that may receive the downlink grant. Such implementation has advantage of lower overhead in resources, but may not be configured to report CSIs for all component carriers. Alternatively, in another example, one trigger (in one single downlink grant) can only trigger an A-CSI on PUCCH carrier for a single report contains CSI for all DL CCs. Such implementation may provide full report of CSI of all downlink component carriers, but have a larger overlap due to over-report. Additional simplification techniques may include configuring the CSI trigger field to a single bit (e.g., x=1 bit) for all downlink grants that follow the first scheduling grant message (e.g., downlink grant A) triggering A-CSI report on PUCCH if the associated ACK/NACK for the PDSCHs scheduled by later DL grants overlap with the A-CSI report triggered by the first scheduling grant message.

Figure 6:
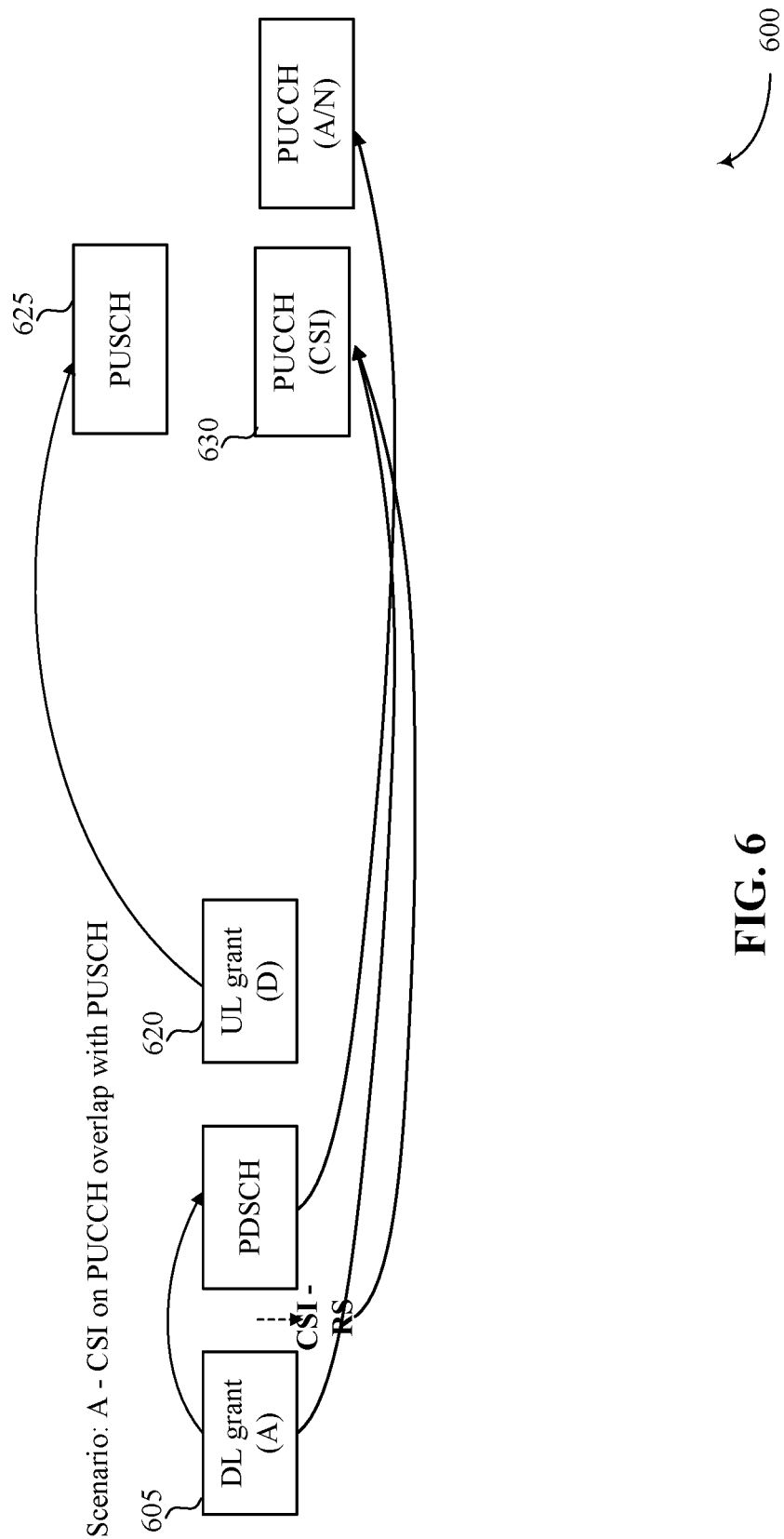
FIG. 6 is a timing diagram of an example of scenarios of CSI report trigger based on downlink grant followed subsequently with uplink grant issuance in accordance with aspects of the present disclosure.

FIG. 6 is a timing diagram 600 of an example of scenarios of CSI report trigger based on downlink grant 605 followed subsequently with uplink grant 620 issuance in accordance with aspects of the present disclosure. Specifically, in some examples, the second scheduling grant message 620 may be an uplink grant message (e.g., where the first scheduling grant message 605 is downlink grant during a first time period followed by the uplink grant during a second time period). In such instances, when A-CSI report 630 is triggered by first scheduling grant message 605 (e.g., DL grant A) and overlaps with PUSCH 625 scheduled by the second scheduling grant 620 (e.g., UL grant D) where the UL grant (D) 620 is received later than DL grant (A) 605, the base station may be configured to either duplicate the A-CSI trigger from the DL grant (A) 605 into UL grant (D) 620, or override the A-CSI trigger from the DL grant (A) 605 by a new trigger in UL grant (D) 620. In turn, the UE may be configured to ignore or discard the trigger in the first scheduling grant message 605 (e.g., DL grant A) and follow the trigger in second scheduling grant 620 (e.g., UL grant D (later grant)).

Figure 7:
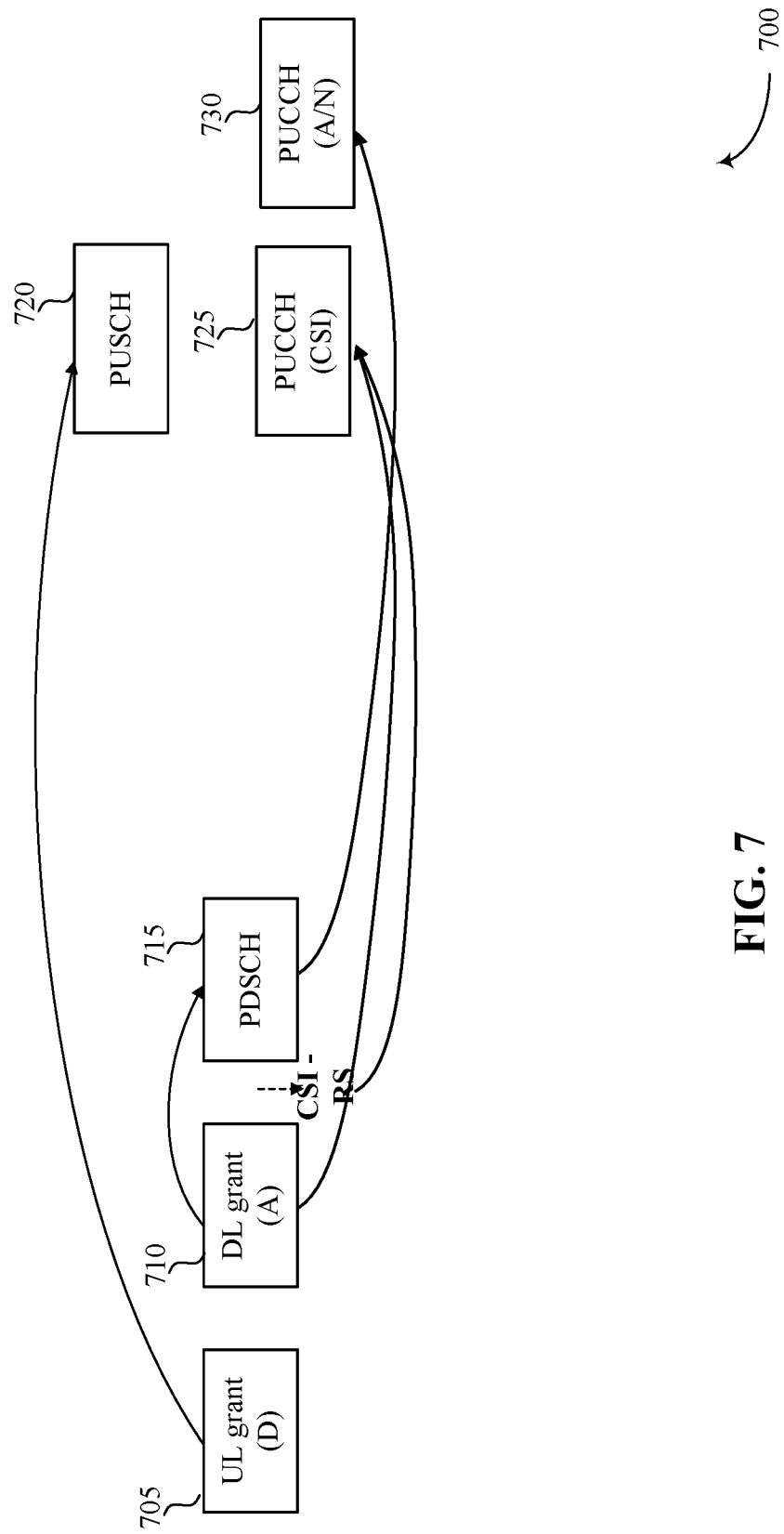
FIG. 7 is timing diagram of an example of CSI on PUCCH overlapping with PUSCH in accordance with aspects of the present disclosure.

FIG. 7 is timing diagram of an example of CSI reporting 725 on PUCCH overlapping with PUSCH 720 in accordance with aspects of the present disclosure. In some examples, the downlink grant message 710 may be the second scheduling grant message that is preceded by the uplink grant 705 (e.g., first scheduling grant message). In such scenario where the UL grant (D) is received earlier than the DL grant (A), the UE may either: (1) treat this case as an error case; (2) follow the A-CSI trigger in UL grant (earlier grant), ignore the A-CSI trigger in DL grant (later grant); (3) if UL grant already has A-CSI trigger, follow the A-CSI trigger in UL grant and ignore the A-CSI trigger in the DL grant; otherwise, follow the A-CSI trigger in the DL grant to generate CSI report, multiplex the CSI report on PUSCH by puncture certain plurality of PUSCH REs or (4) follow the A-CSI trigger in the later grant, which DL grant A.

Figure 8:
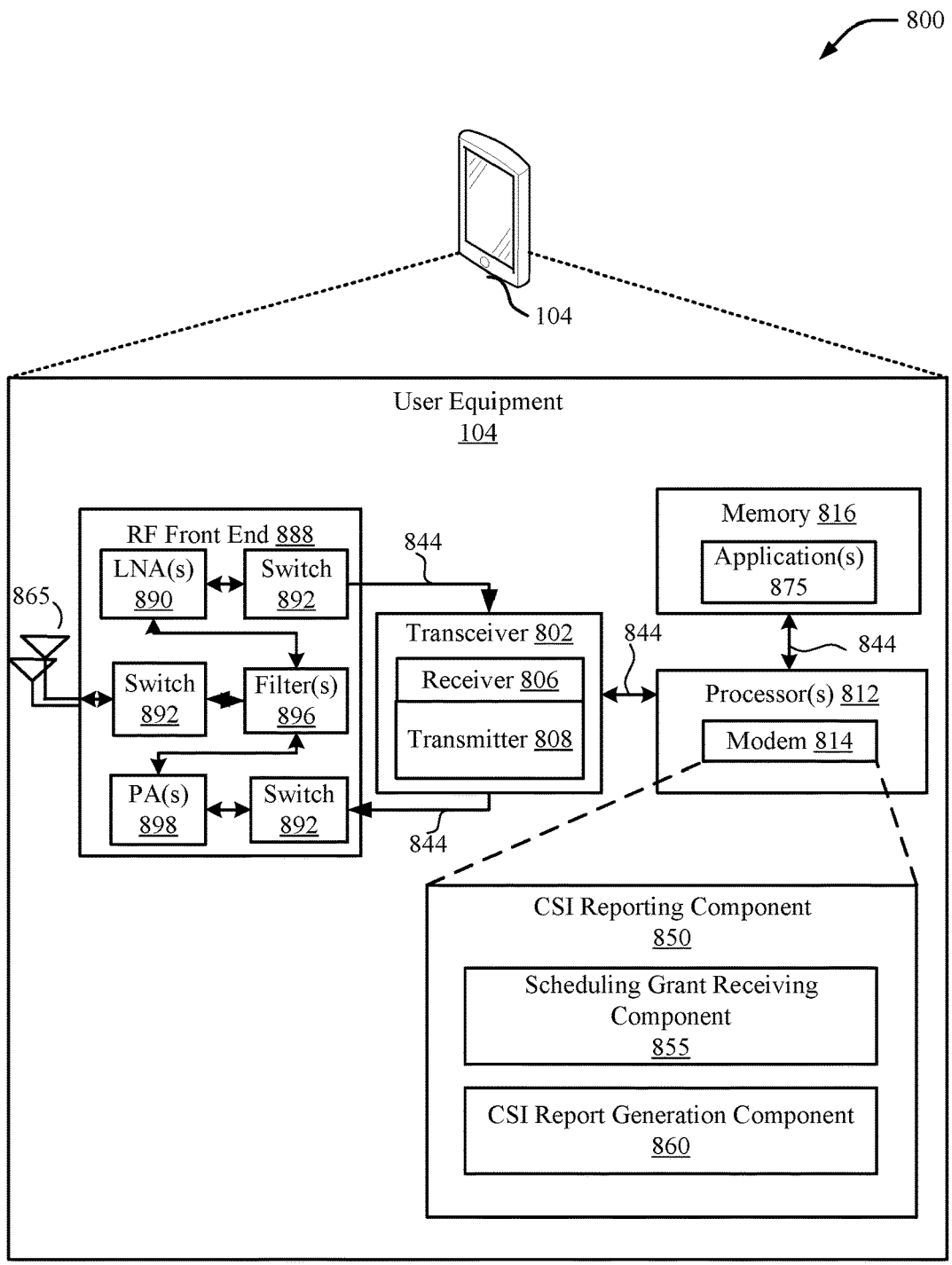
FIG. 8 is a schematic diagram of an example implementation of various components of a user equipment in accordance with various aspects of the present disclosure.

FIG. 8 illustrates a hardware components and subcomponents of a device that may be a UE 104 for implementing one or more methods (e.g., method 900) described herein in accordance with various aspects of the present disclosure. For example, one example of an implementation of the UE 104 may include a variety of components, some of which have already been described above, but including components such as one or more processors 812, memory 816 and transceiver 802 in communication via one or more buses 844, which may operate in conjunction with the CSI reporting component 850 to perform functions described herein related to including one or more methods (e.g., 900) of the present disclosure. In some examples, the CSI reporting component may include a scheduling grant receiving component 855 for receiving one or more scheduling grants (e.g., DL or UL grants) from the base station that include A-CSI trigger. The scheduling grant receiving component 855 may decode one or more scheduling grant messages and identify whether the UE is configured to prepare and transmit a CSI report. The CSI reporting component 850 may also include CSI report generation component 860 for generating CSI reports based on receiving one or more scheduling grants.

The one or more processors 812, modem 814, memory 816, transceiver 802, RF front end 888 and one or more antennas 865, may be configured to support voice and/or data calls (simultaneously or non-simultaneously) in one or more radio access technologies. In an aspect, the one or more processors 812 can include a modem 414 that uses one or more modem processors. The various functions related to CSI reporting component 850 may be included in modem 814 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with CSI reporting component 850 may be performed by transceiver 802.

The memory 816 may be configured to store data used herein and/or local versions of application(s) 875 or CSI reporting component 850 and/or one or more of its subcomponents being executed by at least one processor 812. The memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, the memory 816 may be a non-transitory computer-readable storage medium that stores one or more computer-executable codes defining CSI reporting component 850 and/or one or more of its subcomponents, and/or data associated therewith, when the UE 104 is operating at least one processor 812 to execute CSI reporting component 850 and/or one or more of its subcomponents.

The transceiver 802 may include at least one receiver 806 and at least one transmitter 808. The receiver 806 may include hardware, firmware, and/or software code executable by a processor for receiving data, the code comprising instructions and being stored in a memory (e.g., computer-readable medium). The receiver 806 may be, for example, a radio frequency (RF) receiver. In an aspect, the receiver 806 may receive signals transmitted by at least one UE 104. Additionally, receiver 806 may process such received signals, and also may obtain measurements of the signals, such as, but not limited to, Ec/Io, SNR, RSRP, RSSI, etc. The transmitter 808 may include hardware, firmware, and/or software code executable by a processor for transmitting data, the code comprising instructions and being stored in a memory (e.g., computer-readable medium). A suitable example of the transmitter 808 may including, but is not limited to, an RF transmitter.

Moreover, in an aspect, transmitting device may include the RF front end 888, which may operate in communication with one or more antennas 865 and transceiver 802 for receiving and transmitting radio transmissions, for example, wireless communications transmitted by at least one base station 102 or wireless transmissions transmitted by UE 104. The RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, the LNA 890 can amplify a received signal at a desired output level. In an aspect, each LNA 890 may have a specified minimum and maximum gain values. In an aspect, the RF front end 888 may use one or more switches 892 to select a particular LNA 890 and its specified gain value based on a desired gain value for a particular application.

Further, for example, one or more PA(s) 898 may be used by the RF front end 888 to amplify a signal for an RF output at a desired output power level. In an aspect, each PA 898 may have specified minimum and maximum gain values. In an aspect, the RF front end 888 may use one or more switches 892 to select a particular PA 898 and its specified gain value based on a desired gain value for a particular application.

Also, for example, one or more filters 896 can be used by the RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, the RF front end 888 can use one or more switches 892 to select a transmit or receive path using a specified filter 896, LNA 890, and/or PA 898, based on a configuration as specified by the transceiver 802 and/or processor 812.

As such, the transceiver 802 may be configured to transmit and receive wireless signals through one or more antennas 865 via the RF front end 888. In an aspect, the transceiver 802 may be tuned to operate at specified frequencies such that transmitting device can communicate with, for example, one or more base stations 102 or one or more cells associated with one or more base stations 102 or other UEs 104. In an aspect, for example, the modem 814 can configure the transceiver 802 to operate at a specified frequency and power level based on the configuration of the transmitting device and the communication protocol used by the modem 814.

In an aspect, the modem 814 can be a multiband-multimode modem, which can process digital data and communicate with the transceiver 802 such that the digital data is sent and received using the transceiver 802. In an aspect, the modem 814 can be multiband and be configured to support multiple frequency bands for a specific communications protocol. In an aspect, the modem 814 can be multimode and be configured to support multiple operating networks and communications protocols. In an aspect, the modem 814 can control one or more components of transmitting device (e.g., RF front end 888, transceiver 802) to enable transmission and/or reception of signals from the network based on a specified modem configuration. In an aspect, the modem configuration can be based on the mode of the modem 814 and the frequency band in use. In another aspect, the modem configuration can be based on UE configuration information associated with transmitting device as provided by the network during cell selection and/or cell reselection.

Figure 9:
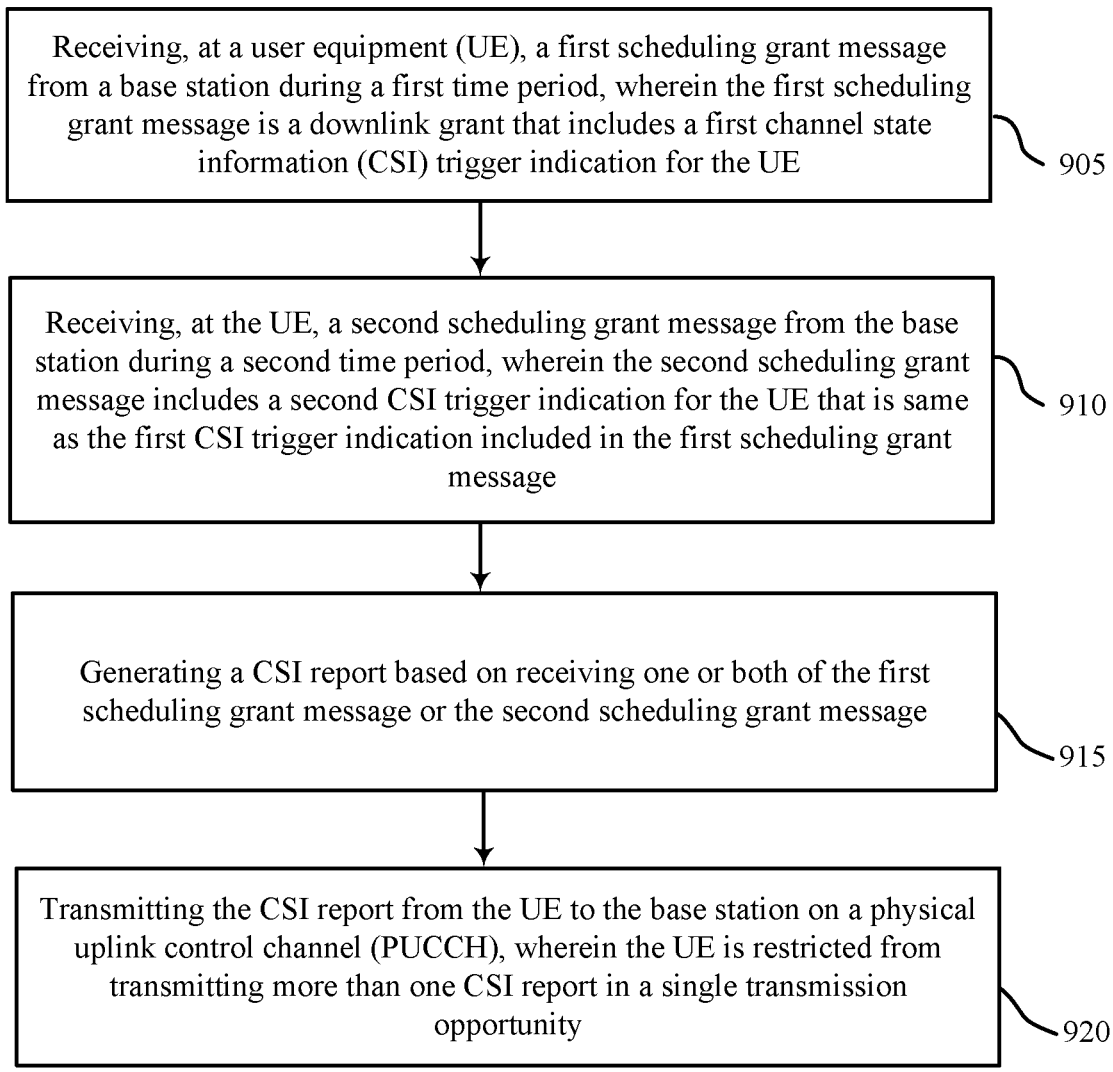
FIG. 9 is a flow diagram of an example of a method of wireless communication implemented by the UE in accordance with aspects of the present disclosure.

Referring to FIG. 9, an example method 900 for wireless communications in accordance with aspects of the present disclosure may be performed by one or more UEs 104 discussed with reference to FIGS. 1 and 8. Although the method 900 is described below with respect to the elements of the UE 104, other components may be used to implement one or more of the steps described herein.

At block 905, the method 900 may include receiving, at a UE, a first scheduling grant message from a base station during a first time period, wherein the first scheduling grant message is a downlink grant that includes a first CSI trigger indication for the UE. Aspects of block 905 may be performed by the transceiver 802, CSI reporting component 850, and scheduling grant receiving component 855 as described with reference to FIG. 8. Specifically, data packets received at one or more antennas 865 from the base station may be processed by a transceiver 802 and forwarded to the scheduling grant receiving component 855 via the modem 814 of the UE. Thus, CSI reporting component 850, scheduling grant receiving component 855, transceiver 802, one or more antennas 865, modem 814, processor 812, and/or the UE 104 or one of its subcomponents may define the means for receiving, at a UE, a first scheduling grant message from a base station during a first time period.

At block 910, the method may include receiving, at the UE, a second scheduling grant message from the base station during a second time period, wherein the second scheduling grant message includes a second CSI trigger indication for the UE that is same as the first CSI trigger indication included in the first scheduling grant message. In some examples, the second scheduling grant message may be one of a second downlink grant message or an uplink grant message. Additionally, the first CSI trigger indication and the second CSI trigger indication may include a CSI trigger state that identifies one or both of CSI report setting or CSI-reference signal (CSI-RS) resource setting to be used by the UE.

In some aspects, the first scheduling grant message may be received from the base station on a first component carrier, and the second scheduling grant message may be received from the base station on a second component carrier. Thus, in some situations, the first CSI trigger indication included in the first scheduling grant message may be duplicated for all subsequent scheduling grant messages received across at least the first component carrier and the second component carrier where scheduling transmission of hybrid automatic repeat request (HARQ)/acknowledgement (ACK) of the scheduled physical downlink shared channel (PDSCH) overlaps with transmission of the CSI report. In other instances, the first CSI trigger indication included in the first scheduling grant message may be duplicated for at least portion of subsequent scheduling grant messages received across at least the first component carrier and the second component carrier where scheduling transmission of HARQ/ACK of the scheduled PDSCH overlaps transmission of the CSI report.

Furthermore, the first CSI trigger indication included in the first scheduling grant message may trigger the CSI report on the PUCCH for the first component carrier over which the first scheduling grant message is received. Alternatively, the first CSI trigger indication included in the first scheduling grant message may trigger the CSI report on the PUCCH for at least the first component carrier and the second component carrier.

Additionally, the second CSI trigger indication may be a single bit trigger field included in the second scheduling grant message received from the base station. Thus, in some aspects, the second scheduling grant message may be an uplink grant message, and the uplink grant message may include the second CSI trigger indication for the UE that is the same as the first CSI trigger indication included in the first scheduling grant message that is the downlink grant message. In other examples, the uplink grant message for the second scheduling grant message may include the second CSI trigger indication for the UE that overrides the first CSI trigger indication included in the first scheduling grant message that is the downlink grant message. In such instance, the method may include discarding, at the UE, the first scheduling grant message from the base station during a first time period, wherein the first scheduling grant message is the downlink grant that includes the first CSI trigger indication for the UE. To this end, the UE may generate and transmit the CSI report from the UE to the base station on the PUCCH based the second CSI trigger indication included in the second scheduling grant message.

Aspects of block 910 may also be performed by the transceiver 802, CSI reporting component 850, and scheduling grant receiving component 855 as described with reference to FIG. 8. Specifically, as noted above, data packets received at one or more antennas 865 from the base station may be processed by a transceiver 802 and forwarded to the scheduling grant receiving component 855 via the modem 814 of the UE. Thus, CSI reporting component 850, scheduling grant receiving component 855, transceiver 802, one or more antennas 865, modem 814, processor 812, and/or the UE 104 or one of its subcomponents may define the means for receiving, at the UE, a second scheduling grant message from the base station during a second time period, wherein the second scheduling grant message includes a second CSI trigger indication for the UE that is same as the first CSI trigger indication included in the first scheduling grant message.

At block 915, the method 900 may include generating a CSI report based on receiving one or both of the first scheduling grant message or the second scheduling grant message. Aspects of block 915 may also be performed by the CSI reporting component 850 as described with reference to FIG. 8. Thus, CSI reporting component 850, modem 814, processor 812, and/or the UE 104 or one of its subcomponents may define the means for generating a CSI report based on receiving one or both of the first scheduling grant message or the second scheduling grant message.

At block 920, the method 900 may include transmitting the CSI report from the UE to the base station on a physical uplink control channel (PUCCH), wherein the UE is restricted from transmitting more than one CSI report in a single transmission opportunity. Aspects of block 920 may also be performed by the CSI reporting component 850 as described with reference to FIG. 8. Thus, CSI reporting component 850, modem 814, processor 812, and/or the UE 104 or one of its subcomponents may define the means for transmitting the CSI report from the UE to the base station on a physical uplink control channel (PUCCH), wherein the UE is restricted from transmitting more than one CSI report in a single transmission opportunity.

Figure 10:
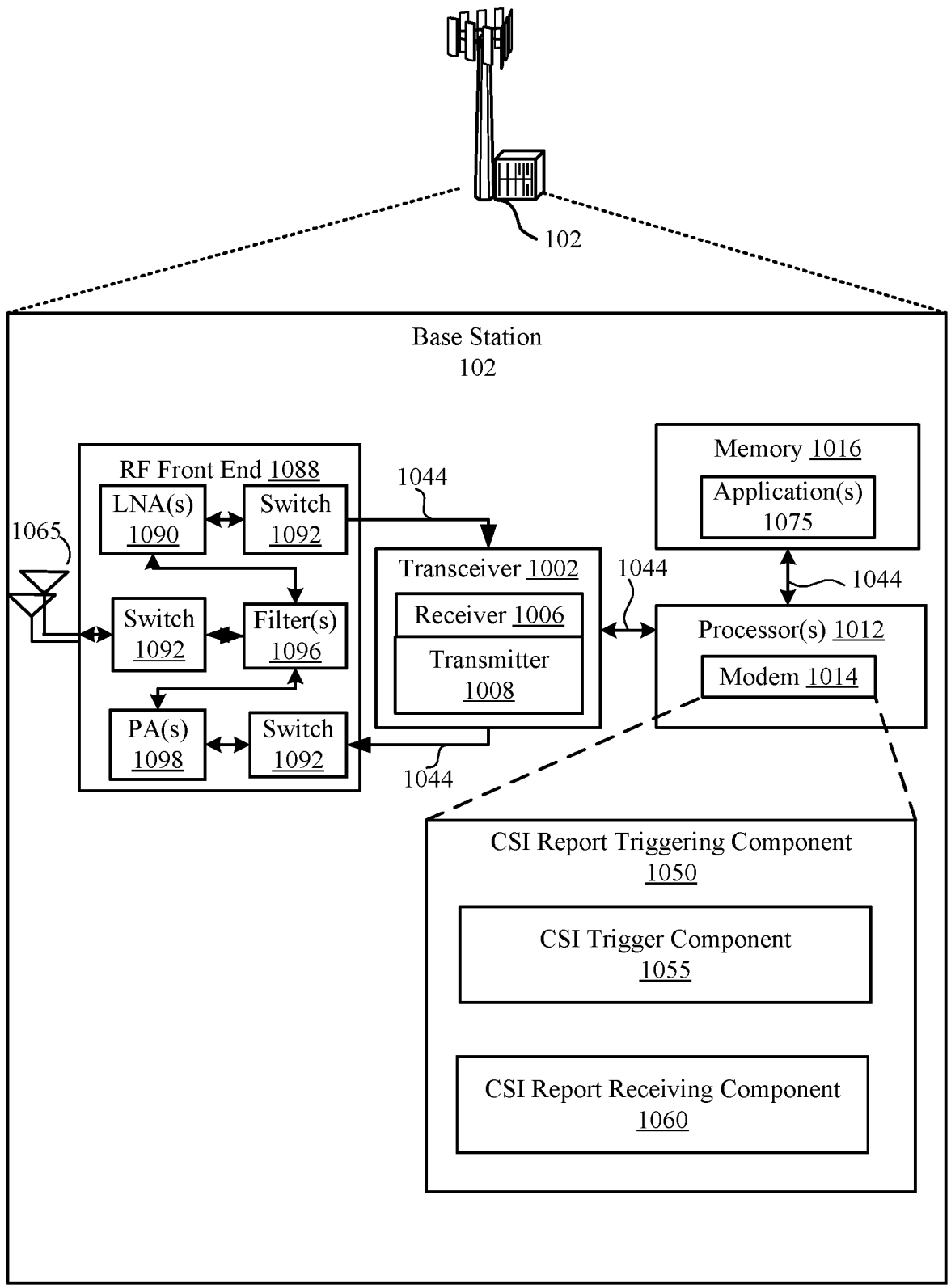
FIG. 10 is a schematic diagram of an example implementation of various components of a base station in accordance with various aspects of the present disclosure.

FIG. 10 illustrates a hardware components and subcomponents of a device that may be a base station 102 for implementing one or more methods (e.g., method 1100) described herein in accordance with various aspects of the present disclosure. For example, one example of an implementation of the base station 102 may include a variety of components, some of which have already been described above, but including components such as one or more processors 1012, memory 1016 and transceiver 1002 in communication via one or more buses 1044, which may operate in conjunction with the CSI report triggering component 1050 to perform functions described herein related to including one or more methods (e.g., 1100) of the present disclosure. For example, the CSI report triggering component 1050 may include CSI trigger generation component 1055 for generating one or more scheduling grant messages (e.g., DL/UL grants) from a base station to a UE during multiple time periods. The CSI report triggering component 1050 may also include a CSI report receiving component 1060 for receiving a CSI report from the UE in response to transmission of the scheduling grant message(s).

The one or more processors 1012, modem 1014, memory 1016, transceiver 1002, RF front end 1088 and one or more antennas 1065, may be configured to support voice and/or data calls (simultaneously or non-simultaneously) in one or more radio access technologies. In an aspect, the one or more processors 1012 can include a modem 1014 that uses one or more modem processors. The various functions related to CSI report triggering component 1050 may be included in modem 1014 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1014 associated with CSI report triggering component 1050 may be performed by transceiver 1002.

The memory 1016 may be configured to store data used herein and/or local versions of application(s) 1075 or CSI report triggering component 1050 and/or one or more of its subcomponents being executed by at least one processor 1012. The memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, the memory 1016 may be a non-transitory computer-readable storage medium that stores one or more computer-executable codes defining CSI report triggering component 1050 and/or one or more of its subcomponents, and/or data associated therewith, when the base station 102 is operating at least one processor 1012 to execute CSI report triggering component 1050 and/or one or more of its subcomponents.

The transceiver 1002 may include at least one receiver 1006 and at least one transmitter 1008. The receiver 1006 may include hardware, firmware, and/or software code executable by a processor for receiving data, the code comprising instructions and being stored in a memory (e.g., computer-readable medium). The receiver 1006 may be, for example, a radio frequency (RF) receiver. In an aspect, the receiver 1006 may receive signals transmitted by at least one UE 104. Additionally, receiver 1006 may process such received signals, and also may obtain measurements of the signals, such as, but not limited to, Ec/Io, SNR, RSRP, RSSI, etc. The transmitter 1008 may include hardware, firmware, and/or software code executable by a processor for transmitting data, the code comprising instructions and being stored in a memory (e.g., computer-readable medium). A suitable example of the transmitter 1008 may including, but is not limited to, an RF transmitter.

Moreover, in an aspect, transmitting device may include the RF front end 1088, which may operate in communication with one or more antennas 1065 and transceiver 1002 for receiving and transmitting radio transmissions, for example, wireless communications transmitted by at least one base station 102 or wireless transmissions transmitted by UE 104. The RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, the LNA 1090 can amplify a received signal at a desired output level. In an aspect, each LNA 1090 may have a specified minimum and maximum gain values. In an aspect, the RF front end 1088 may use one or more switches 1092 to select a particular LNA 1090 and its specified gain value based on a desired gain value for a particular application.

Further, for example, one or more PA(s) 1098 may be used by the RF front end 1088 to amplify a signal for an RF output at a desired output power level. In an aspect, each PA 1098 may have specified minimum and maximum gain values. In an aspect, the RF front end 1088 may use one or more switches 1092 to select a particular PA 1098 and its specified gain value based on a desired gain value for a particular application.

Also, for example, one or more filters 1096 can be used by the RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, the RF front end 1088 can use one or more switches 1092 to select a transmit or receive path using a specified filter 1096, LNA 1090, and/or PA 1098, based on a configuration as specified by the transceiver 1002 and/or processor 1012.

As such, the transceiver 1002 may be configured to transmit and receive wireless signals through one or more antennas 1065 via the RF front end 888. In an aspect, the transceiver 1002 may be tuned to operate at specified frequencies such that transmitting device can communicate with, for example, one or more base stations 102 or one or more cells associated with one or more base stations 102 or other UEs 104. In an aspect, for example, the modem 1014 can configure the transceiver 1002 to operate at a specified frequency and power level based on the configuration of the transmitting device and the communication protocol used by the modem 1014.

In an aspect, the modem 1014 can be a multiband-multimode modem, which can process digital data and communicate with the transceiver 1002 such that the digital data is sent and received using the transceiver 1002. In an aspect, the modem 1014 can be multiband and be configured to support multiple frequency bands for a specific communications protocol. In an aspect, the modem 1014 can be multimode and be configured to support multiple operating networks and communications protocols. In an aspect, the modem 1014 can control one or more components of transmitting device (e.g., RF front end 1088, transceiver 1002) to enable transmission and/or reception of signals from the network based on a specified modem configuration. In an aspect, the modem configuration can be based on the mode of the modem 1014 and the frequency band in use. In another aspect, the modem configuration can be based on base station configuration information associated with transmitting device as provided by the network during cell selection and/or cell reselection.

Figure 11:
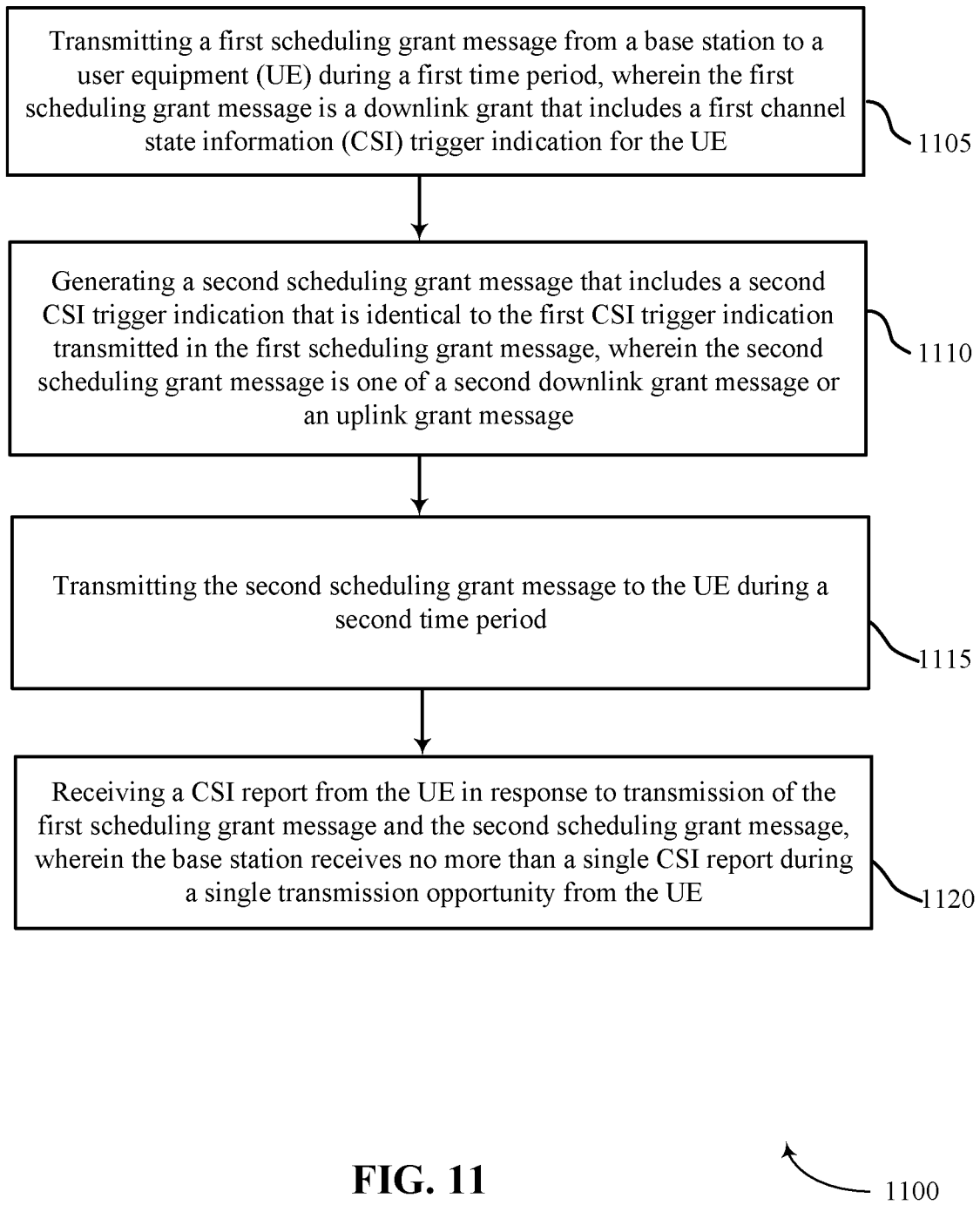
FIG. 11 is a flow diagram of an example of a method of wireless communication implemented by the base station in accordance with aspects of the present disclosure.

Referring to FIG. 11, an example method 1100 for wireless communications in accordance with aspects of the present disclosure may be performed by one or more base stations 102 discussed with reference to FIGS. 1 and 10. Although the method 1100 is described below with respect to the elements of the base station 102, other components may be used to implement one or more of the steps described herein.

At block 1105, the method 1100 may include transmitting a first scheduling grant message from a base station to a user equipment (UE) during a first time period, wherein the first scheduling grant message is a downlink grant that includes a first channel state information (CSI) trigger indication for the UE. Aspects of block 1105 may be performed by the transceiver 1002, CSI report triggering component 1050, and CSI trigger component 1055 as described with reference to FIG. 10. In some examples, the CSI trigger component 1055 may generate one or more scheduling grants and route the scheduling grant message via the modem 1014 to the transceiver 1002 that transmits the converted wireless signal through one or more antennas 1065 to the UE. Thus, CSI report triggering component 1050, CSI trigger component 1055, transceiver 1002, one or more antennas 1065, modem 1014, processor 1012, and/or the base station 102 or one of its subcomponents may define the means for transmitting a first scheduling grant message from a base station to a UE during a first time period.

At block 1110, the method may include generating a second scheduling grant message that includes a second CSI trigger indication that is identical to the first CSI trigger indication transmitted in the first scheduling grant message, wherein the second scheduling grant message is one of a second downlink grant message or an uplink grant message. In some examples, the first CSI trigger indication and the second CSI trigger indication may include a CSI trigger state that identifies one or both of CSI report setting or CSI-reference signal (CSI-RS) resource setting to be used by the UE. Aspects of block 1110 may also be performed by the transceiver 1002 and CSI report triggering component 1050 as described with reference to FIG. 10. Thus, CSI report triggering component 1050, CSI trigger component 1055, transceiver 1002, one or more antennas 1065, modem 1014, processor 1012, and/or the base station or one of its subcomponents may define the means for generating a second scheduling grant message that includes a second CSI trigger indication that is identical to the first CSI trigger indication transmitted in the first scheduling grant message.

At block 1115, the method may include transmitting the second scheduling grant message to the UE during a second time period. In some aspects, the first scheduling grant message may be transmitted by the base station on a first component carrier, and the second scheduling grant message may be transmitted by the base station on a second component carrier. Thus, in some situations, the first CSI trigger indication included in the first scheduling grant message may be duplicated for all subsequent scheduling grant messages received across at least the first component carrier and the second component carrier where scheduling transmission of PUCCH may overlap with transmission of the CSI report. In other instances, the first CSI trigger indication included in the first scheduling grant message may be duplicated for at least portion of subsequent scheduling grant messages received across at least the first component carrier and the second component carrier where scheduling transmission of PUCCH overlaps transmission of the CSI report.

Furthermore, the first CSI trigger indication included in the first scheduling grant message may trigger the CSI report on the PUCCH for the first component carrier over which the first scheduling grant message is received. Alternatively, the first CSI trigger indication included in the first scheduling grant message may trigger the CSI report on the PUCCH for at least the first component carrier and the second component carrier.

Additionally, the second CSI trigger indication may be a single bit trigger field included in the second scheduling grant message received from the base station. Thus, in some aspects, the second scheduling grant message may be an uplink grant message, and the uplink grant message may include the second CSI trigger indication for the UE that is the same as the first CSI trigger indication included in the first scheduling grant message that is the downlink grant message. In other examples, the uplink grant message for the second scheduling grant message may include the second CSI trigger indication for the UE that overrides the first CSI trigger indication included in the first scheduling grant message that is the downlink grant message.

Aspects of block 1115 may also be performed by the transceiver 1002 and CSI report triggering component 1050 as described with reference to FIG. 10. Thus, CSI report triggering component 1050, transceiver 1002, one or more antennas 1065, modem 1014, processor 1012, and/or the base station or one of its subcomponents may define the means for transmitting the second scheduling grant message to the UE during a second time period.

At block 1120, the method may include receiving a CSI report from the UE in response to transmission of the first scheduling grant message and the second scheduling grant message, wherein the base station receives no more than a single CSI report during a single transmission opportunity from the UE. Aspects of block 1120 may also be performed by the CSI report triggering component 1050 and the CSI report receiving component 1060 as described with reference to FIG. 10. Thus, CSI report triggering component 1050, CSI report receiving component 1060, one or more antennas 1065, modem 1014, processor 1012, and/or the base station or one of its subcomponents may define the means for receiving a CSI report from the UE in response to transmission of the first scheduling grant message and the second scheduling grant message.

SOME FURTHER EXAMPLE CLAUSES

Implementation examples are described in the following numbered clauses:

1. A method for wireless communications, comprising:
   receiving, at a user equipment (UE), a first scheduling grant message from a base station during a first time period, wherein the first scheduling grant message is a downlink grant that includes a first channel state information (CSI) trigger indication for the UE;
   receiving, at the UE, a second scheduling grant message from the base station during a second time period, wherein the second scheduling grant message includes a second CSI trigger indication for the UE that is same as the first CSI trigger indication included in the first scheduling grant message;
   generating a CSI report based on receiving one or both of the first scheduling grant message or the second scheduling grant message; and
   transmitting the CSI report from the UE to the base station on a physical uplink control channel (PUCCH), wherein the UE is restricted from transmitting more than one CSI report in a single transmission opportunity.
2. The method of clause 1, wherein the second scheduling grant message is one of a second downlink grant message or an uplink grant message.
3. The method of any of clauses 1-2, wherein the first CSI trigger indication and the second CSI trigger indication includes a CSI trigger state that identifies one or both of CSI report setting or CSI-reference signal (CSI-RS) resource setting to be used by the UE.
4. The method of any of the clauses 1-3, wherein the first scheduling grant message is received from the base station on a first component carrier, and
   wherein the second scheduling grant message is received from the base station on a second component carrier.
5. The method of any preceding clause, wherein the first CSI trigger indication included in the first scheduling grant message is duplicated for all subsequent scheduling grant messages received across at least the first component carrier and the second component carrier where scheduling transmission of hybrid automatic repeat request (HARD)/acknowledgement (ACK) of the scheduled physical downlink shared channel (PDSCH) overlaps with transmission of the CSI report.
6. The method of any preceding clause, wherein the first CSI trigger indication included in the first scheduling grant message is duplicated for at least portion of subsequent scheduling grant messages received across at least the first component carrier and the second component carrier where scheduling transmission of hybrid automatic repeat request (HARD)/acknowledgement (ACK) of the scheduled physical downlink shared channel (PDSCH) overlaps transmission of the CSI report.
7. The method of any preceding clause, wherein the first CSI trigger indication included in the first scheduling grant message triggers the CSI report on the PUCCH for the first component carrier over which the first scheduling grant message is received.
8. The method of any preceding clause, wherein the first CSI trigger indication included in the first scheduling grant message triggers the CSI report on the PUCCH for at least the first component carrier and the second component carrier.
9. The method of any preceding clause, wherein the second CSI trigger indication is a single bit trigger field included in the second scheduling grant message received from the base station.
10. The method of any preceding clause, wherein the second scheduling grant message is an uplink grant message.
11. The method of any preceding clause, further comprising:
    discarding, at the UE, the first scheduling grant message from the base station during a first time period, wherein the first scheduling grant message is the downlink grant that includes the first CSI trigger indication for the UE; and
    transmitting the CSI report from the UE to the base station on the PUCCH based on the second CSI trigger indication included in the second scheduling grant message.
12. The method of any preceding clause, wherein the single transmission opportunity is a transmission slot or sub-slot.
13. An apparatus for wireless communications, comprising:
    at least one processor;
    and memory coupled with the at least one processor, the memory including instructions executable by the at least one processor to cause the apparatus to:
    receive, at a user equipment (UE), a first scheduling grant message from a base station during a first time period, wherein the first scheduling grant message is a downlink grant that includes a first channel state information (CSI) trigger indication for the UE;
    receive, at the UE, a second scheduling grant message from the base station during a second time period, wherein the second scheduling grant message includes a second CSI trigger indication for the UE that is same as the first CSI trigger indication included in the first scheduling grant message;
    generate a CSI report based on receiving one or both of the first scheduling grant message or the second scheduling grant message; and
    transmit the CSI report from the UE to the base station on a physical uplink control channel (PUCCH), wherein the UE is restricted from transmitting more than one CSI report in a single transmission opportunity.
14. The apparatus of any preceding clause, wherein the second scheduling grant message is one of a second downlink grant message or an uplink grant message.
15. The apparatus of any preceding clause, wherein the first CSI trigger indication and the second CSI trigger indication includes a CSI trigger state that identifies one or both of CSI report setting or CSI-reference signal (CSI-RS) resource setting to be used by the UE.

16. The apparatus of any preceding clause, wherein the first scheduling grant message is received from the base station on a first component carrier, and wherein the second scheduling grant message is received from the base station on a second component carrier.

17. The apparatus of any preceding clause, wherein the first CSI trigger indication included in the first scheduling grant message is duplicated for all subsequent scheduling grant messages received across at least the first component carrier and the second component carrier where scheduling transmission of hybrid automatic repeat request (HARQ)/acknowledgement (ACK) of the scheduled physical downlink shared channel (PDSCH) overlaps with transmission of the CSI report.

18. The apparatus of any preceding clause, wherein the first CSI trigger indication included in the first scheduling grant message is duplicated for at least portion of subsequent scheduling grant messages received across at least the first component carrier and the second component carrier where scheduling transmission of hybrid automatic repeat request (HARQ)/acknowledgement (ACK) of the scheduled physical downlink shared channel (PDSCH) overlaps transmission of the CSI report.

19. The apparatus of any preceding clause, wherein the first CSI trigger indication included in the first scheduling grant message triggers the CSI report on the PUCCH for the first component carrier over which the first scheduling grant message is received.

20. A method for wireless communications, comprising:

transmitting a first scheduling grant message from a base station to a user equipment (UE) during a first time period, wherein the first scheduling grant message is a downlink grant that includes a first channel state information (CSI) trigger indication for the UE;

generating a second scheduling grant message that includes a second CSI trigger indication that is identical to the first CSI trigger indication transmitted in the first scheduling grant message, wherein the second scheduling grant message is one of a second downlink grant message or an uplink grant message;

transmitting the second scheduling grant message to the UE during a second time period; and receiving a CSI report from the UE in response to transmission of the first scheduling grant message and the second scheduling grant message, wherein the base station receives no more than a single CSI report during a single transmission opportunity from the UE.

21. The method of any preceding clause, wherein the first CSI trigger indication and the second CSI trigger indication includes a CSI trigger state that identifies one or both of CSI report setting or CSI-reference signal (CSI-RS) resource setting to be used by the UE.

22 The method of any preceding clause, wherein the first scheduling grant message is transmitted from the base station on a first component carrier, and wherein the second scheduling grant message is transmitted from the base station on a second component carrier.

23. The method of any preceding clause, wherein the first CSI trigger indication included in the first scheduling grant message is duplicated for all subsequent scheduling grant messages received across at least the first component carrier and the second component carrier where scheduling transmission of PUCCH overlaps with transmission of the CSI report.

24. The method of any preceding clause, wherein the first CSI trigger indication included in the first scheduling grant message is duplicated for at least portion of subsequent scheduling grant messages received across at least the first component carrier and the second component carrier where scheduling transmission of PUCCH overlaps transmission of the CSI report.

25. The method of any preceding clause, wherein the first CSI trigger indication included in the first scheduling grant message triggers the CSI report on the PUCCH for the first component carrier over which the first scheduling grant message is received.

26. The method of any preceding clause, wherein the first CSI trigger indication included in the first scheduling grant message triggers the CSI report on the PUCCH for at least the first component carrier and the second component carrier.

27. The method of any preceding clause, wherein the second CSI trigger indication is a single bit trigger field included in the second scheduling grant message received from the base station.

28. The method of any preceding clause, wherein the second scheduling grant message is the uplink grant message.

29. The method of any preceding clause, wherein the single transmission opportunity is a transmission slot or sub-slot.

30. An apparatus for wireless communications, comprising:
at least one processor;
and memory coupled to the at least one processor, the memory including instructions executable by the at least one processor to cause the apparatus to:

transmit a first scheduling grant message from a base station to a user equipment (UE) during a first time period, wherein the first scheduling grant message is a downlink grant that includes a first channel state information (CSI) trigger indication for the UE;

generate a second scheduling grant message that includes a second CSI trigger indication that is identical to the first CSI trigger indication transmitted in the first scheduling grant message, wherein the second scheduling grant message is one of a second downlink grant message or an uplink grant message;

transmit the second scheduling grant message to the UE during a second time period; and receive a CSI report from the UE in response to transmission of the first scheduling grant message and the second scheduling grant message, wherein the base station receives a single CSI report during a single transmission opportunity.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   receiving, at a user equipment (UE), on a first component carrier, a first scheduling grant message from a base station during a first time period, wherein the first scheduling grant message is a first downlink grant that includes a first channel state information (CSI) trigger indication for the UE;
   receiving, at the UE, one or more subsequent scheduling grant messages, wherein transmission of hybrid automatic repeat request (HARQ)/acknowledgement (ACK) of a physical downlink shared channel (PDSCH) scheduled by at least some of the one or more subsequent scheduling grant messages overlaps with transmission of a CSI report and wherein the at least some of the one or more subsequent scheduling grant messages include a duplicate of the first CSI trigger indication included in the first scheduling grant message;
   generating the CSI report based on receiving one or both of the first scheduling grant message or the one or more subsequent scheduling grant messages; and
   transmitting the CSI report from the UE to the base station on a physical uplink control channel (PUCCH), wherein the UE is restricted from transmitting more than one CSI report in a single transmission opportunity.

2. The method of claim 1, wherein the one or more subsequent scheduling grant messages are one of a second downlink grant message or an uplink grant message.

3. The method of claim 1, wherein the first CSI trigger indication and the duplicate of the first CSI trigger indication each includes a CSI trigger state that identifies one or both of a CSI report setting or a CSI-reference signal (CSI-RS) resource setting to be used by the UE.

4. The method of claim 1, wherein the at least some of the one or more subsequent scheduling grant messages are received from the base station on a second component carrier.

5. The method of claim 4, wherein the at least some of the one or more subsequent scheduling grant messages comprise all subsequent scheduling grant messages.

6. The method of claim 4, wherein the first CSI trigger indication included in the first scheduling grant message triggers the CSI report on the PUCCH for the first component carrier over which the first scheduling grant message is received.

7. The method of claim 4, wherein the first CSI trigger indication included in the first scheduling grant message triggers the CSI report on the PUCCH for at least the first component carrier and the second component carrier.

8. The method of claim 1, wherein the duplicate of the first CSI trigger indication is a single bit trigger field included in the one or more subsequent scheduling grant messages received from the base station.

9. The method of claim 1, wherein the one or more subsequent scheduling grant messages are uplink grant messages.

10. The method of claim 1, further comprising:
    discarding, at the UE, the first scheduling grant message from the base station during a first time period; and
    transmitting the CSI report from the UE to the base station on the PUCCH based on the duplicate of the first CSI trigger indication included in the one or more subsequent scheduling grant messages.

11. The method of claim 1, wherein the single transmission opportunity is a transmission slot or sub-slot.

12. An apparatus for wireless communications, comprising:
    at least one processor;
    and memory coupled with the at least one processor, the memory including instructions executable by the at least one processor to cause the apparatus to:
      receive, at a user equipment (UE), on a first component carrier, a first scheduling grant message from a base station during a first time period, wherein the first scheduling grant message is a first downlink grant that includes a first channel state information (CSI) trigger indication for the UE;
      receive, at the UE, one or more subsequent scheduling grant messages, wherein transmission of hybrid automatic repeat request (HARQ)/acknowledgement (ACK) of a physical downlink shared channel (PDSCH) scheduled by at least some of the one or more subsequent scheduling grant messages overlaps with transmission of a CSI report and wherein the at least some of the one or more subsequent scheduling grant messages include a duplicate of the first CSI trigger indication included in the first scheduling grant message;
      generate the CSI report based on receiving one or both of the first scheduling grant message or the one or more subsequent scheduling grant messages; and
      transmit the CSI report from the UE to the base station on a physical uplink control channel (PUCCH), wherein the UE is restricted from transmitting more than one CSI report in a single transmission opportunity.

13. The apparatus of claim 12, wherein the one or more subsequent scheduling grant messages are one of a second downlink grant message or an uplink grant message.

14. The apparatus of claim 12, wherein the first CSI trigger indication and the duplicate of the first CSI trigger indication each includes a CSI trigger state that identifies one or both of CSI report setting or CSI-reference signal (CSI-RS) resource setting to be used by the UE.

15. The apparatus of claim 12,
wherein the at least some of the one or more subsequent scheduling grant messages are received from the base station on a second component carrier.

16. The apparatus of claim 15, wherein the at least some of the one or more subsequent scheduling grant messages comprise all subsequent scheduling grant messages.

17. The apparatus of claim 15, wherein the first CSI trigger indication included in the first scheduling grant message triggers the CSI report on the PUCCH for the first component carrier over which the first scheduling grant message is received.

18. A method for wireless communications, comprising:
transmitting, on a first component carrier, a first scheduling grant message from a base station to a user equipment (UE) during a first time period, wherein the first scheduling grant message is a first downlink grant that includes a first channel state information (CSI) trigger indication for the UE;
generating, at the base station, one or more subsequent scheduling grant messages, wherein transmission of a physical uplink control channel (PUCCH) associated with at least some of the one or more subsequent scheduling grant messages overlaps with transmission of a CSI report and wherein the at least some of the one or more subsequent scheduling grant messages include a CSI trigger indication that is a duplicate of the first CSI trigger indication transmitted in the first scheduling grant message, wherein the one or more subsequent scheduling grant messages are one of a second downlink grant message or an uplink grant message;
transmitting the one or more subsequent scheduling grant messages, from the base station, to the UE; and
receiving, at the base station, the CSI report from the UE in response to transmission of the first scheduling grant message and the one or more subsequent scheduling grant messages, wherein the base station receives no more than a single CSI report during a single transmission opportunity from the UE.

19. The method of claim 18, wherein the first CSI trigger indication and the duplicate of the first CSI trigger indication each includes a CSI trigger state that identifies one or both of CSI report setting or CSI-reference signal (CSI-RS) resource setting to be used by the UE.

20. The method of claim 18,
wherein the at least some of the one or more subsequent scheduling grant messages are transmitted from the base station on a second component carrier.

21. The method of claim 20, wherein the at least some of the subsequent scheduling grant messages comprise all subsequent scheduling grant messages.

22. The method of claim 20, wherein the first CSI trigger indication included in the first scheduling grant message triggers the CSI report on the PUCCH for the first component carrier over which the first scheduling grant message is received.

23. The method of claim 20, wherein the first CSI trigger indication included in the first scheduling grant message triggers the CSI report on the PUCCH for at least the first component carrier and the second component carrier.

24. The method of claim 18, wherein the duplicate of the first CSI trigger indication is a single bit trigger field included in the one or more subsequent scheduling grant messages received from the base station.

25. The method of claim 18, wherein the one or more subsequent scheduling grant messages are the uplink grant message.

26. The method of claim 18, wherein the single transmission opportunity is a transmission slot or sub-slot.

27. An apparatus for wireless communications, comprising:
at least one processor;
and memory coupled with the at least one processor, the memory including instructions executable by the at least one processor to cause the apparatus to:
transmit, on a first component carrier, a first scheduling grant message from a base station to a user equipment (UE) during a first time period, wherein the first scheduling grant message is a first downlink grant that includes a first channel state information (CSI) trigger indication for the UE;
generate, at the base station, one or more subsequent scheduling grant messages, wherein transmission of a physical uplink control channel PUCCH associated with at least some of the one or more subsequent scheduling grant messages overlaps with transmission of a CSI report and wherein the at least some of the one or more subsequent scheduling grant messages include a CSI trigger indication that is a duplicate of the first CSI trigger indication transmitted in the first scheduling grant message, wherein the one or more subsequent scheduling grant messages are one of a second downlink grant message or an uplink grant message;
transmit the one or more subsequent scheduling grant messages, from the base station, to the UE; and
receive, at the base station, the CSI report from the UE in response to transmission of the first scheduling grant message and the one or more subsequent scheduling grant messages, wherein the base station receives a single CSI report during a single transmission opportunity.

* * * * *